United States Patent [19]
Teramachi et al.

[11] Patent Number: 5,993,064
[45] Date of Patent: Nov. 30, 1999

[54] BALL CONNECTING BODY, AND LINEAR GUIDE DEVICE AND BALL SCREW DEVICE UTILIZING THE BALL CONNECTING BODY

[75] Inventors: Hiroshi Teramachi; Kaichi Suga, both of Tokyo, Japan

[73] Assignee: THK Co., Ltd., Tokyo, Japan

[21] Appl. No.: 09/068,457

[22] PCT Filed: Sep. 12, 1997

[86] PCT No.: PCT/JP97/03246

§ 371 Date: Nov. 24, 1998

§ 102(e) Date: Nov. 24, 1998

[87] PCT Pub. No.: WO98/12442

PCT Pub. Date: Mar. 26, 1998

[30] Foreign Application Priority Data

Sep. 17, 1996 [JP] Japan ................................ 8/245314
Dec. 11, 1996 [JP] Japan ................................ 8/330956
Dec. 27, 1996 [JP] Japan ................................ 8/350737

[51] Int. Cl.$^6$ ................................................ F16C 29/06
[52] U.S. Cl. ................................ 384/43; 384/45; 384/51
[58] Field of Search ............................ 384/43, 44, 45, 384/49, 51, 523, 525, 526, 529, 534; 474/203, 154; 59/2, 4, 78, 80; D11/13, 6

[56] References Cited

U.S. PATENT DOCUMENTS

| | | | |
|---|---|---|---|
| 449,964 | 4/1891 | Simonds | 384/525 |
| 2,566,421 | 9/1951 | Lapointe | 384/526 |
| 5,156,462 | 10/1992 | Jacob et al. | 384/49 |

FOREIGN PATENT DOCUMENTS

| | | |
|---|---|---|
| 5-52215 | 3/1993 | Japan. |
| 5-52217 | 3/1993 | Japan. |
| 7-208466 | 8/1995 | Japan. |
| 3739 | 2/1908 | United Kingdom ........ 384/525 |

*Primary Examiner*—Thomas R. Hannon
*Attorney, Agent, or Firm*—Nikaido, Marmelstein, Murray & Oram, LLP

[57] ABSTRACT

The present invention relates to a ball connector in which a number of balls are arranged in one row and held rollably and which is used by being integrated, for example, into a linear guide device for endless sliding and a ball endless track of a ball screw device, particularly to a ball connector capable of being used by freely flexing or twisting the ball connector. Such a ball connector is a ball connector constituted by a number of balls arranged in one row at predetermined intervals and a connector belt rotatably holding the balls and connecting together the balls contiguous to each other, the connector belt is provided with four of belt members formed in a strip-like shape along peripheral faces of the balls and brought into contact with the plurality of rolls and in the meantime, the belt members are connected mutually with other ones of the belt members at intermediaries of the balls contiguous to each other and the connector belt is formed in a shape constricted in comparison with an outer diameter of the ball at such connecting positions.

8 Claims, 22 Drawing Sheets

BALL CONNECTING BODY, AND LINEAR GUIDE DEVICE AND BALL SCREW DEVICE UTILIZING THE BALL CONNECTING BODY

TECHNICAL FIELD

The present invention relates to a ball connector in which a number of balls are arranged in one row and held rollably and which is used by being integrated, for example, to a linear guide device for endless sliding and a ball endless track of a ball screw device, particularly to a ball connector which can be used by freely flexing or twisting the ball connector.

BACKGROUND ART

Conventionally, as a linear guide device for guiding a movable body such as a table or the like along a fixed unit such as a bed or the like, there has been known a bearing for linear sliding in which a sliding base carrying a movable body such as a table or the like is moved along a track rail arranged on a fixed unit such as a bed, a saddle or the like, or a ball spline device in which a cylindrical nut member fitted to a spline shaft is moved along the spline shaft via balls.

Among them, as a former bearing for linear sliding, there has been known a constitution comprising a track rail having a ball rolling groove, a sliding base having a load rolling groove opposed to the ball rolling groove as well as a ball return hole in parallel therewith, having a direction change path for guiding balls from the load rolling groove to the ball return hole and moved along the track rail, and a number of balls rolling between the sliding base and the track rail while carrying a load and circulating an endless track constituted by the load rolling groove, the ball return hole and the direction change path of the sliding base.

Further, as a latter ball spline device, there has been known a constitution comprising a spline shaft having a ball rolling groove along the axial direction and a nut member having a load rolling groove opposed to the ball rolling groove and fitted to the outer periphery of the spline shaft via balls, where the nut member is moved along the spline shaft similarly in accordance with endless circulation of the balls and which is used by transmitting torque mutually between the nut member and the spline shaft.

According to the conventional linear guide device constituted as described above, the endless track of a sliding member such as the sliding base or the nut member is filled with the balls and accordingly, when the sliding member is moved along the track rail or a guide shaft such as the spline shaft, the balls contiguous to each other are circulated in the endless track while colliding with each other or rubbing each other and there poses a problem where the balls are worn at an early stage and the device life is shortened.

Hence, as means for resolving such a problem, there has been proposed a bearing for linear sliding in which a ball connector where a number of balls are aligned and held is integrated to the endless track (Japanese Unexamined Patent Publication No. JP-A-5-52217). As shown by FIG. 25 and FIG. 26, according to such a ball connector 200, spacers 202 are interposed among respective balls 201 contiguous to each other, the spacers 202 are connected by a pair of strip-like connecting members 203 along a direction of arranging the balls by which the balls 201 are connected in a rosary-like shape and the ball connector is fabricated by molding flexible resin by injection molding in which the balls 201 are arranged in a die as cores.

According to the conventional bearing for linear sliding constituted as described above, as shown by FIG. 27, the above-described ball connector 200 is integrated to a ball return hole 205 and direction change paths 206 of a sliding base 204 and circulated in the endless track and in this case, the spacers 202 are interposed among the balls 201 contiguous to each other and accordingly, mutual friction or collision among the balls is prevented and wear of the balls 201 can be prevented as less as possible.

Meanwhile, in circulating the balls in the endless track, the ball relieved of a load needs to be scooped up from the ball rolling groove of the track rail to the direction change path of the sliding base and in such a scoop-up operation, as shown by FIG. 28, it is preferable to guide the ball 201 in a direction where a ball rolling groove 208 of the track rail 207 and a load rolling groove 209 of the sliding base 204 are opposed to each other (hereinafter, described as ball contact direction). Because when the ball 201 is guided in such a direction, meandering of the ball 201 in the direction change path 206 is prevented and circulation of the ball 201 in the endless track of the sliding base 204 is carried out smoothly.

Meanwhile, from a standpoint of avoiding magnifying of the sliding base 204, there is a case where formation of the ball return hole 205 in the ball contact direction is not necessarily proper and there is a case where the ball return hole 205 cannot be formed in the ball contact direction for avoiding interference with a tap hole since the tap hole is formed at the sliding base 204 to fix a movable body such as a table or the like.

Accordingly, in order to promote the degree of freedom of a position of forming the ball return hole 205 in respect of the sliding base 204 while achieving smooth formation of circulation of the balls 201 in the endless track, as shown by FIG. 29, the direction change path 206 for guiding the balls from the load rolling groove 209 to the ball return hole 205 needs to form to bend from the ball contact direction.

Further, in the case of considering the inherent role of the direction change path where the direction of rolling the balls is reversed, it is preferable that the swirl radius of the balls in such a direction change path is large and for that purpose, the length of the direction change path needs to set long. However, in the case where the ball return hole is positioned in the ball contact direction in view from the load rolling groove, when the length of the direction change path is set long, an interval between the load rolling groove and the ball return hole is naturally widened and magnification of the sliding base cannot be avoided.

Accordingly, also in view thereof, the ball return hole needs to form at an arbitrary position of the sliding base and the direction change path for communicating and connecting the ball return hole with the load rolling groove needs to form to bend.

However, according to such a conventional ball connector 200, side edges of the strip-like connecting members 203 for connecting the respective spacers 202 are linearly formed and therefore, there poses a problem in which although the ball connector 200 is easy to bend in a direction intersecting with the faces of the connecting members 203 (arrow line A direction in FIG. 26), the ball connector 200 is difficult to bend in a direction in parallel with the faces of the connecting members 203 (arrow line B direction in FIG. 25), when the direction change path 206 is bent to deviate from the ball contact direction as mentioned above, the ball connector 200 is obliged to integrate into the endless track by forcibly bending it and therefore, smooth circulation of the ball connector 200 cannot be expected.

Therefore, according to the conventional linear guide device using the ball connector, when smoothness of circulation of the ball connector in the endless track is considered, the ball return hole is obliged to form in the ball contact direction in view from the load rolling groove which constitutes one factor for magnifying the sliding base.

Further, according to the conventional ball spline device described above, from a standpoint of achieving to downsize the nut member, the ball return hole needs to install as near to the inner diameter of the nut member as possible and it is difficult to form the ball return hole in the ball contact direction in view from the load rolling groove similar to the bearing for linear sliding mentioned above.

Therefore, when the conventional ball chain shown by FIG. 25 is integrated to the endless track of the ball spline device, smooth circulation of the ball chain cannot be expected.

Meanwhile, according to a ball screw device which is used with a purpose of converting rotational movement of a motor into linear movement and which constitutes a linear guide unit of a machine tool or the like by being used along with the linear guide device mentioned above, a screw shaft and a nut member are in mesh with each other via balls and the nut member is similarly provided with an endless track for the balls. Accordingly, from a standpoint of preventing wear of the balls circulating at inside of the nut member, it is preferable also for the ball screw device to integrate a ball connector to the endless track. However, as already has been explained, the conventional ball connector is provided with a structure where it is easy to bend only in specific directions and accordingly, it is difficult to integrate the ball connector to the ball endless track of the ball screw device.

That is, in integrating the ball connector to the ball endless track of the ball screw device, the ball connector needs to wind spirally in respect of the screw shaft. Accordingly, the ball connector needs to circulate not planarly but sterically and in the case of the conventional ball connector having small degree of freedom in respect of the bending direction, smooth circulation of the ball connector in the endless track cannot be expected. Further, when the ball connector is integrated to the ball screw device, the ball connector is obliged to circulate in the endless track in a state accompanied by more or less twist and when the conventional ball connector having a low degree of freedom in respect of the bending performance is used by forcibly twisting it, there is a concern where the balls are detached from the ball connector per se.

DISCLOSURE OF THE INVENTION

The present invention has been carried out in view of such a problem and it is an object of the present invention to provide a ball connector capable of flexing compliantly in any direction and capable of circulating at inside of a ball endless track in a state where balls are firmly held even in the case where it is flexed, twisted or the like.

Further, it is other object of the present invention to provide a linear guide device and a ball screw device utilizing such a ball connector.

That is, a ball connector according to the present invention is a ball connector constituted by a number of balls arranged in one row at predetermined intervals and a flexible connector belt for rotatably holding the balls and connecting together the balls contiguous to each other, the connector belt including four of belt members formed in a strip-like shape along peripheral faces of the balls and brought into contact with the plurality of balls, wherein the belt members are connected mutually with other ones of the belt members at intermediaries of the balls contiguous to each other and the connector belt is formed in a shape constricted in comparison with an outer diameter of the ball at positions of the intermediaries connecting the balls.

Further, according to a linear guide device of the present invention utilizing the ball connector, the linear guide device is constituted by a guide shaft having ball rolling grooves for rolling balls in a longitudinal direction and a slide member having load rolling grooves for rolling the balls while carrying a load between the guide shaft and the load rolling grooves, having endless tracks for circulating the balls and moved along the guide shaft in accordance with circulation of the balls, wherein the ball connector is integrated to one of the endless tracks and the ball connector is circulated in the endless track in accordance with a relative movement between the guide shaft and the slide member.

Further, according to a ball screw device of the present invention using the ball connector, the ball screw device is constituted by a screw shaft having ball rolling grooves in a spiral shape for rolling balls at outer peripheral faces thereof and a nut member having load rolling grooves in a spiral shape for rolling the balls while carrying a load between the screw shaft and the load rolling grooves, having endless tracks for circulating the balls and screwed to the screw shaft via the balls, wherein the ball connector is integrated to one of the endless tracks and the ball connector is circulated in the endless track in accordance with a relative movement between the screw shaft and the nut member.

According to the ball connector of the present invention, the connector belt is provided with four of the belt members formed in a strip-like shape along the spherical faces of the balls and brought into contact with the plurality of balls, the belt members are connected mutually with other ones of the belt members at the intermediaries of the balls contiguous to each other and accordingly, the individual balls are brought into a state where they are embraced by the belt members from four directions and the balls do not come off from the connector belt even in the case where the ball connector is flexed or twisted considerably.

Accordingly, even in the case where the slider of the linear guide device is drawn from the track rail or in the case where the nut member of the ball screw device is drawn from the screw shaft, the balls can be prevented from coming off the slider or the nut member beforehand without using a ball retainer.

Further, the connector belt is formed in a shape constricted in comparison with the outer diameter of the ball at positions where four of the belt members are coupled with each other, that is, at intermediaries of the balls contiguous to each other and accordingly, the ball connector is provided with a structure in which it is easy to flex compliantly in any direction at the positions and easy to absorb twist operated on the ball connector. Therefore, the ball connector can be used by being flexed or twisted in a free direction irrespective of positions of forming the belt members in respect of the ball row and even under such a situation, the ball connector can be circulated smoothly on the endless track.

EXPLANATION OF NOTATIONS

1 . . . Ball chain, 2 . . . Connector belt, 3 . . . Ball, 4 . . . Connecting portion, 5 . . . Belt member

BEST MODE FOR CARRYING OUT THE INVENTION

A detailed explanation will be given of a ball connector and a linear guide device and a ball screw device utilizing a ball connector according to the present invention in reference to attached drawings as follows.

Figure 1:
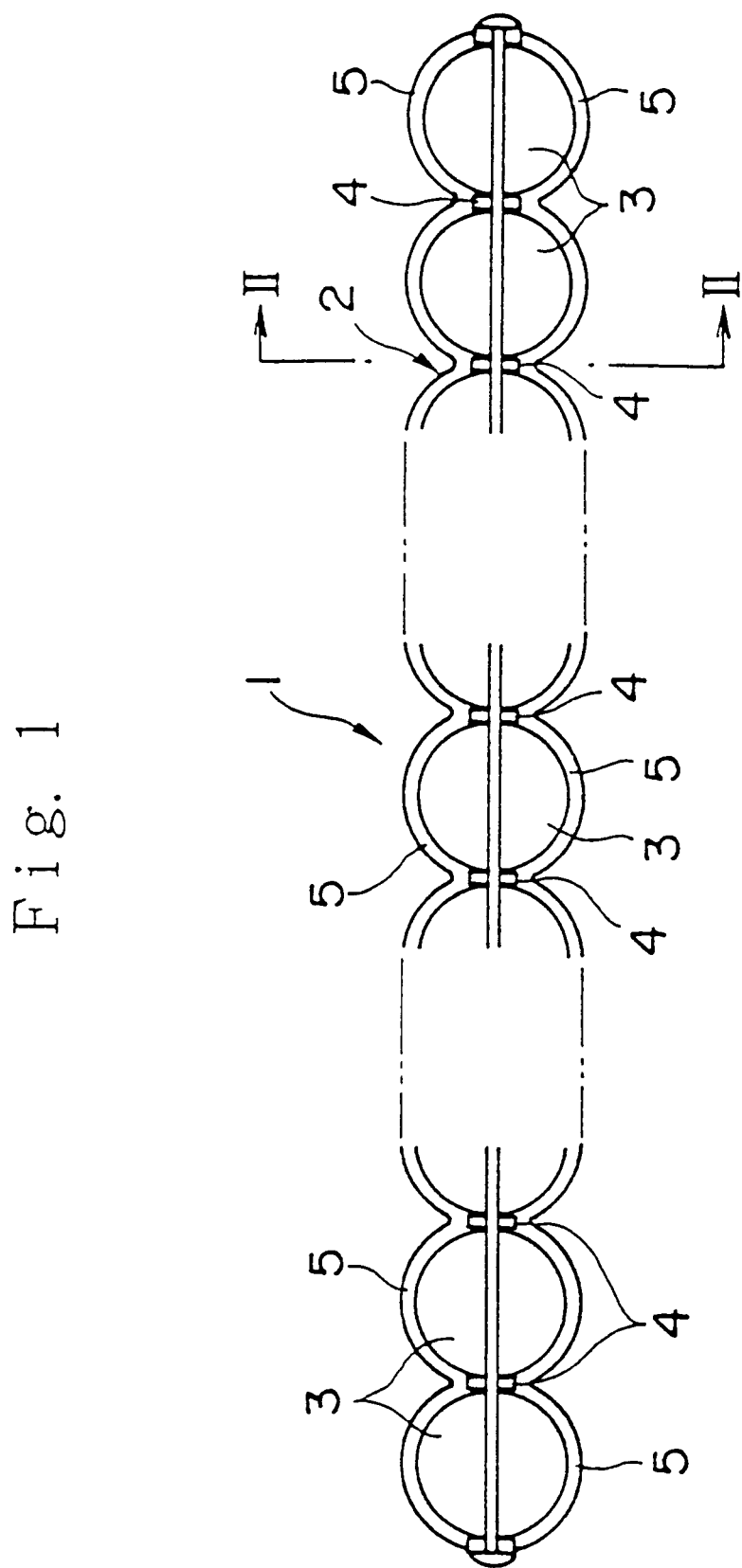
FIG. 1 is a front view showing an embodiment of a ball connector according to the present invention.

FIG. 1 shows an embodiment of a ball connector 1 according to the present invention. According to the ball connector 1, a plurality of balls 3 are arranged at a connector belt 2 made of synthetic resin in one row at predetermined intervals and the balls 3 are freely rotatable in a state where they are held by the connector belt 2.

The connector belt 2 is provided with four of belt members 5 formed in a strip-like shape along spherical faces of the balls 3 and along a direction of arranging the balls 3 and the belt members 4 are mutually connected to other ones of the belt members 5 among the balls 3 contiguous to each other. Further, connecting portions 4 in a disk-like shape are formed among the balls 3 contiguous to each other, the respective belt members 5 are mutually connected to other ones of the belt members 5 via the connecting portions 4 and in the meantime, the connecting portions 4 serve a role as spacers for preventing the balls 3 contiguous to each other from being brought into contact with each other.

Figure 2:
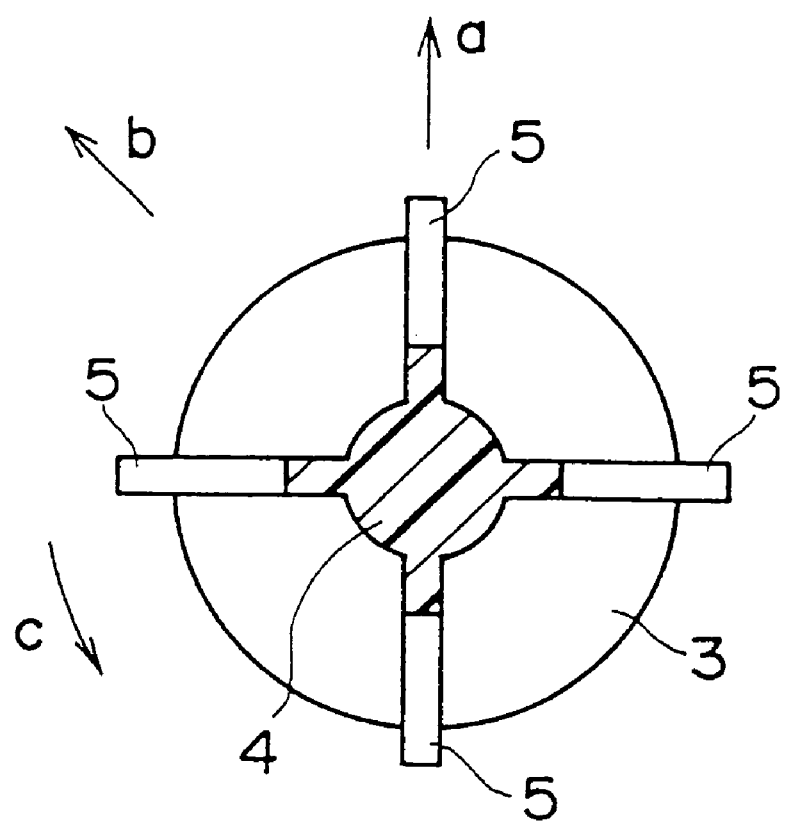
FIG. 2 is a sectional view taken along a line II—II of the ball connector shown by FIG. 1.

As shown by FIG. 2, the belt members 5 are arranged upward, downward, leftward and rightward from the ball row to divide equally the spherical face of the ball 3 into four and restrain the movement of the ball 3 from four directions such that the ball does not come out from a pair of the connecting portions 4 contiguous thereto. Further, the belt member 5 is formed along the spherical face of the ball 3 and when the ball connector 1 is observed as a whole, the connector belt 2 constitutes the most constricted shape at a position of forming the connecting portion 4.

The ball connector 1 is molded by injection molding of synthetic resin in which the balls 3 are arranged in a die as cores and is fabricated by removing the connector belt 2 along with the balls 3 from the die after molding is finished. Further, when the connector belt 2 is simply molded by injection molding, the connecting portions 4 and the belt members 5 of the belt 2 are brought into close contact with the balls 3 and the balls 3 cannot be rotated freely in respect of the connector belt and therefore, according to the embodiment, the ball connector 1 after finished with the molding is dipped in a lubricant of a mineral oil group and clearances are formed between the balls 3 and the connecting portions 4 or the belt members 5 after awaiting for swelling of the connector belt 2 over time by which the balls 3 can freely be rotated.

Further, according to the ball connector 1 of the embodiment constituted as described above, the connector belt 2 constitutes the most constricted shape between the balls 3, that is, the position of forming the connecting portion 4 and accordingly, the ball connector 1 can be flexed freely in any direction at such a position, for example, as shown by FIG. 2, the ball connector 1 can be flexed freely not only in an arrow line "a" direction where the belt member 5 is present but also in an arrow line "b" direction which is disposed between the belt members 5 contiguous to each other.

Meanwhile, as mentioned above, the ball connector 1 is constricted at the positions of forming the respective connecting portions 4 and therefore, even when the ball connector 1 is twisted in an arrow line "c" direction in FIG. 2, the connector belt 2 follows the twisting and can be deformed with no difficulty. Further, even when the connector belt 2 is deformed by following the twisting, there is no concern of detaching the balls 3 from the connector belt 2 since the motion of the balls 3 is constrained from four directions by four sheets of the strip-like belt members 5.

First Embodiment

Figure 3:
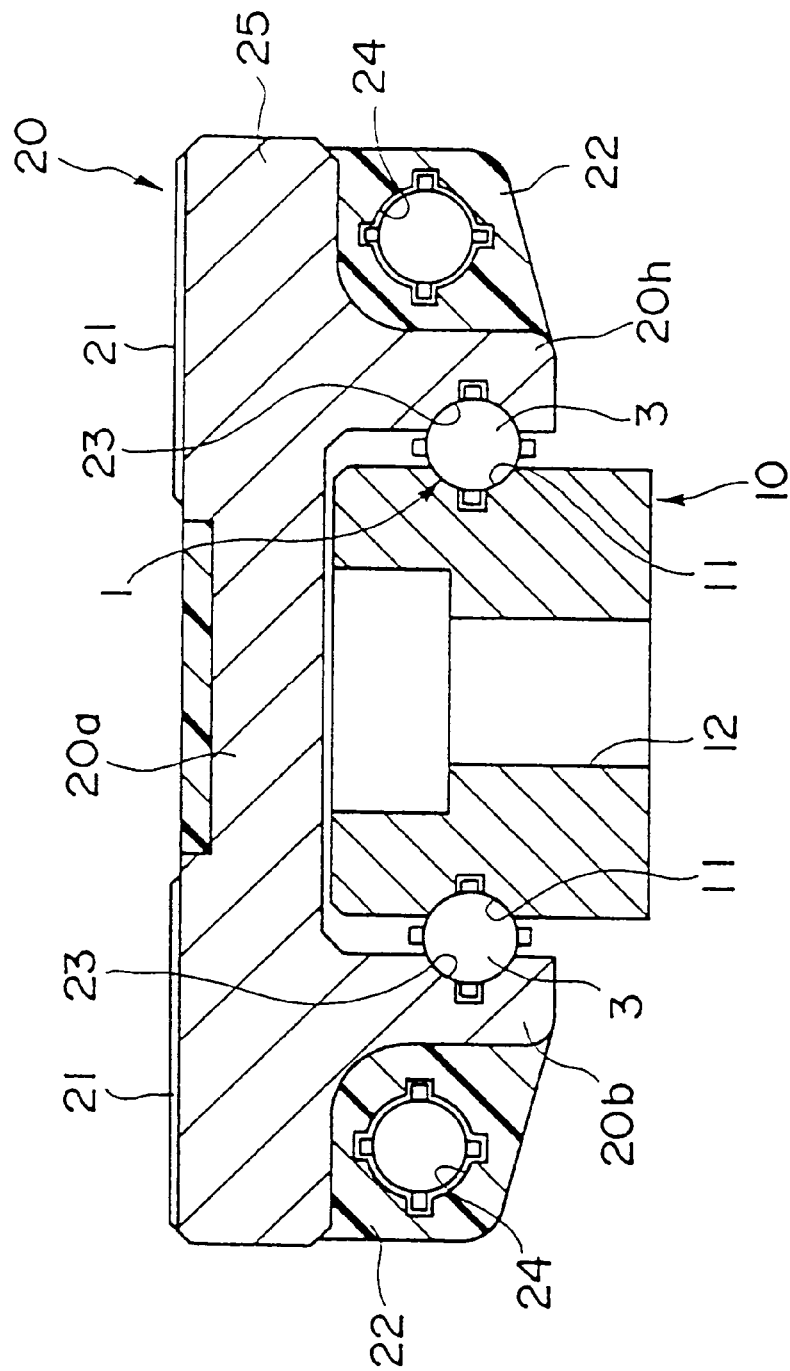
FIG. 3 is a sectional view showing a first embodiment of a bearing for linear sliding to which ball connectors according to the present invention are applied.

FIG. 3 shows a first embodiment in which the ball connector is applied to a bearing for linear sliding.

In FIG. 3, notation 10 designates a track rail arranged to a fixed unit of a bed of a machine tool or the like, notation 20 designates a sliding base having ball endless tracks to which the ball connectors 1 are integrated and guiding a movable body of a table or the like along the track rail 10 and notation 3 designates balls which are rolled between the track rail 10 and the sliding base 20 while carrying load and are circulated endlessly in the sliding base 20.

First, the section of the track rail 10 is formed substantially in a square shape and a total of two streaks of ball rolling grooves 11 in a shape of a Gothic arch are formed at both side faces thereof along the longitudinal direction (direction orthogonal to paper face of FIG. 2). Bolt attaching holes 12 are formed in the track rail 1 along the longitudinal direction at pertinent intervals and the track rail 1 is fixed to the fixed unit by fixing bolts, not illustrated, inserted into the bolt attaching holes 12.

Further, the sliding base 20 is provided with a horizontal portion 20a where attaching faces 21 of the movable body are formed and a pair of skirt portions 20b hung down from the horizontal portion 20a by which the section is formed substantially in a saddle-like shape and load rolling grooves 23 in a shape of a Gothic arch opposed to the ball rolling grooves 11 of the track rail 10 are formed on the inner face side of the respective skirt portions 20b. Further, ball return holes 24 in correspondence with the respective load rolling grooves 23 are formed at the respective skirt portions 20b and the ball 3 which has finished rolling on the load rolling groove 23 and relieved of load is rolled in a direction reverse to a direction of rolling on the load rolling groove 23.

The sliding base 20 is fabricated by utilizing injection molding of synthetic resin. That is, the sliding base 20 is formed by padding resin portions 22 by injection molding to a block main body 25 made of a metal and formed by machining, while portions requiring mechanical strength such as the movable body attaching faces 21, the load rolling face 23 of the balls 3 and so on, are formed at the block main body 25, portions where mechanical strength is not important such as the ball return holes 24 and the like are formed by synthetic resin and light weight formation of the sliding base 20 is achieved as light as possible.

Figure 4:
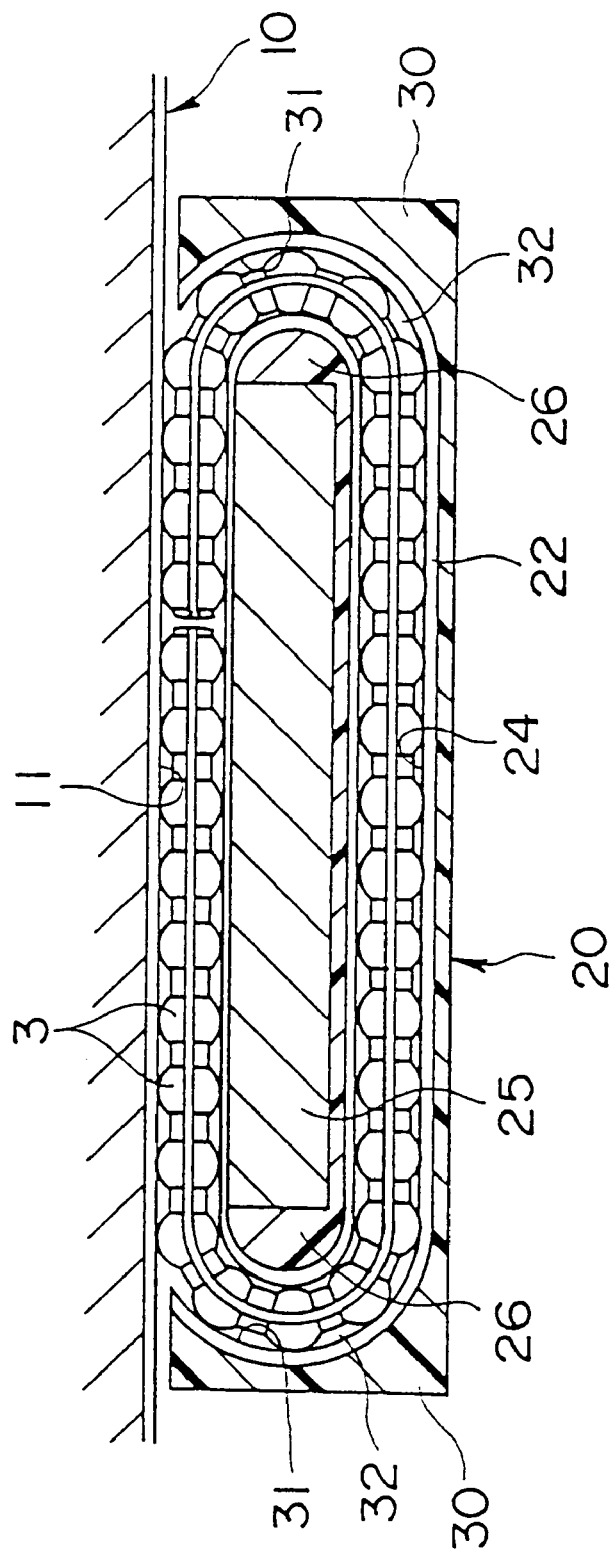
FIG. 4 is a sectional view showing a ball endless track of the bearing for linear sliding shown by FIG. 3.

FIG. 4 is a sectional view showing the ball endless track of the sliding base 20 to which the ball connector 1 is integrated and the endless track is completed by fixing lids 30 made of synthetic resin to both of forward and rearward end faces of the sliding base 20. That is, when the lids 30 are fixed to the slider 20, direction change paths 32 in a U-like shape are completed by fitting ball guide portions 26 on the side of the sliding base 20 into U shape grooves 31 on the side of the lids 30 and the load rolling face 23 and the ball return hole 24 of the sliding WA base 20 are connected by the direction change paths 32.

Figure 5:
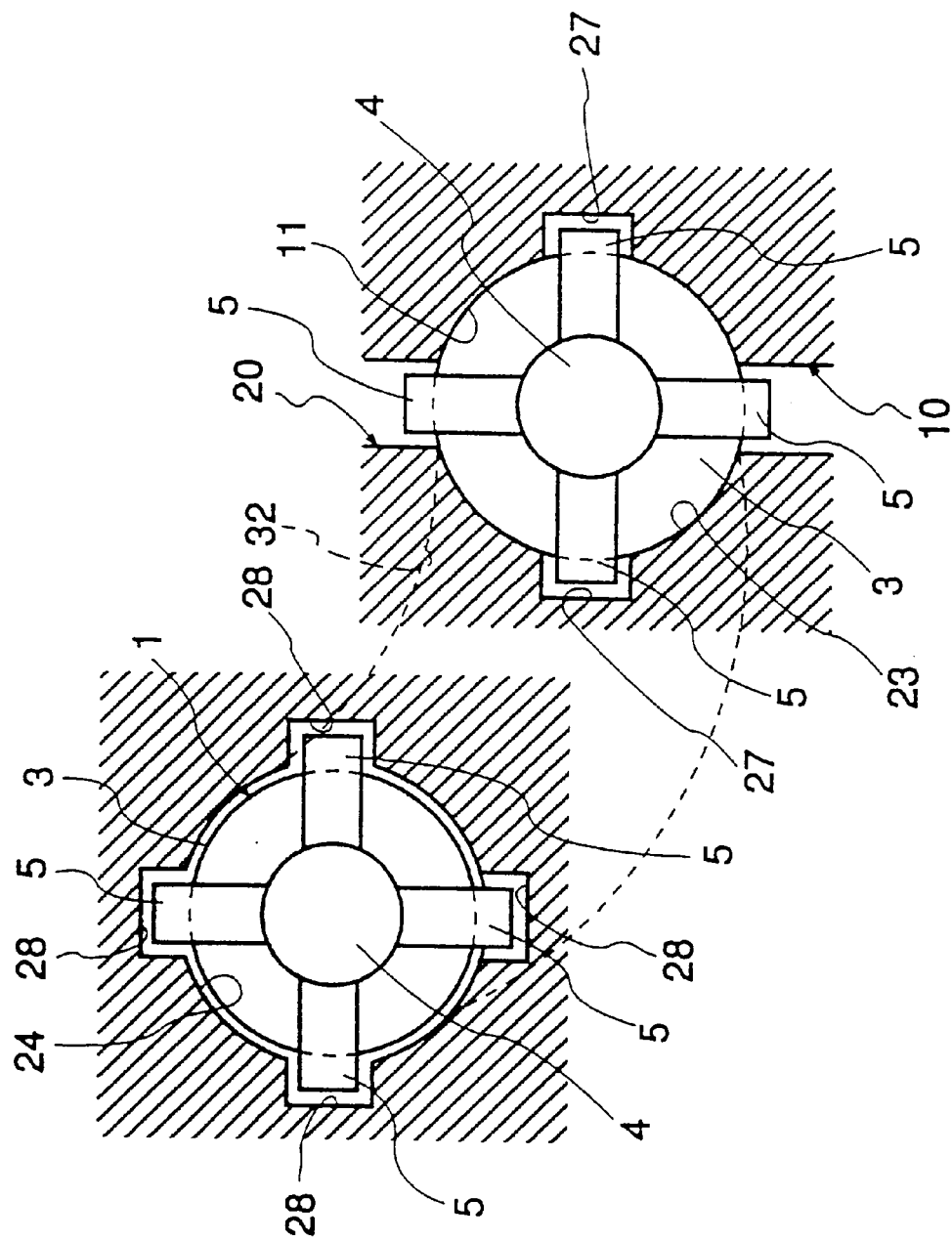
FIG. 5 is a sectional view showing a rolling state of balls in the ball endless track shown by FIG. 4.

FIG. 5 is a magnified view showing a state of rolling the balls in the endless track.

Escape grooves 27 are formed respectively at the deepest portions of the ball rolling groove 11 and the load rolling groove 23 formed in a shape of a Gothic arch and when the balls 3 are rolling on the rolling grooves 23 and 11, the connecting portions 5 of the ball connector 1 are incorporated in the escape grooves 27. Meanwhile, four streaks of guide grooves 28 are formed in the ball return hole 24 of the sliding base 20 along the longitudinal direction, the connecting portions 5 of the ball connector 1 under an unloaded state are guided by the guide grooves 28 and meandering of the ball connector 1 at inside of the ball return hole 24 is prevented.

Further, according to the bearing for linear sliding of the embodiment constituted as described above, when the sliding base 20 is moved on the track rail 10, the balls 3 are rolled on the load rolling grooves 23 of the sliding base 20 and on the ball rolling grooves 11 of the track rail 10 and the ball connectors 1 are circulated at insides of the endless tracks formed at the sliding base 20.

In this case, according to the bearing for linear sliding of the embodiment, as shown by FIG. 5, the position of forming the ball return hole 24 in the sliding base 20 is deviated upwardly from a direction where the ball rolling groove 11 of the track rail 10 and the load rolling groove 23 of the sliding base 20 are opposed to each other, that is, the ball contact direction and the direction change paths 32 for communicating and connecting the load rolling groove 23 with the ball return hole 24, is formed to bend to deviate from the ball contact direction.

However, as mentioned above, the ball connector 1 adopts the structure by which it is easy to flex compliantly in any direction and accordingly, according to the bearing for linear sliding of the embodiment, even in the case where the direction change paths 32 are formed to bend as shown by FIG. 5, the ball connectors 1 can pass through the direction change paths 32 with no difficulty and smooth formation of circulation of the ball connector 1 in the endless track can be achieved.

Second Embodiment

Figure 6:
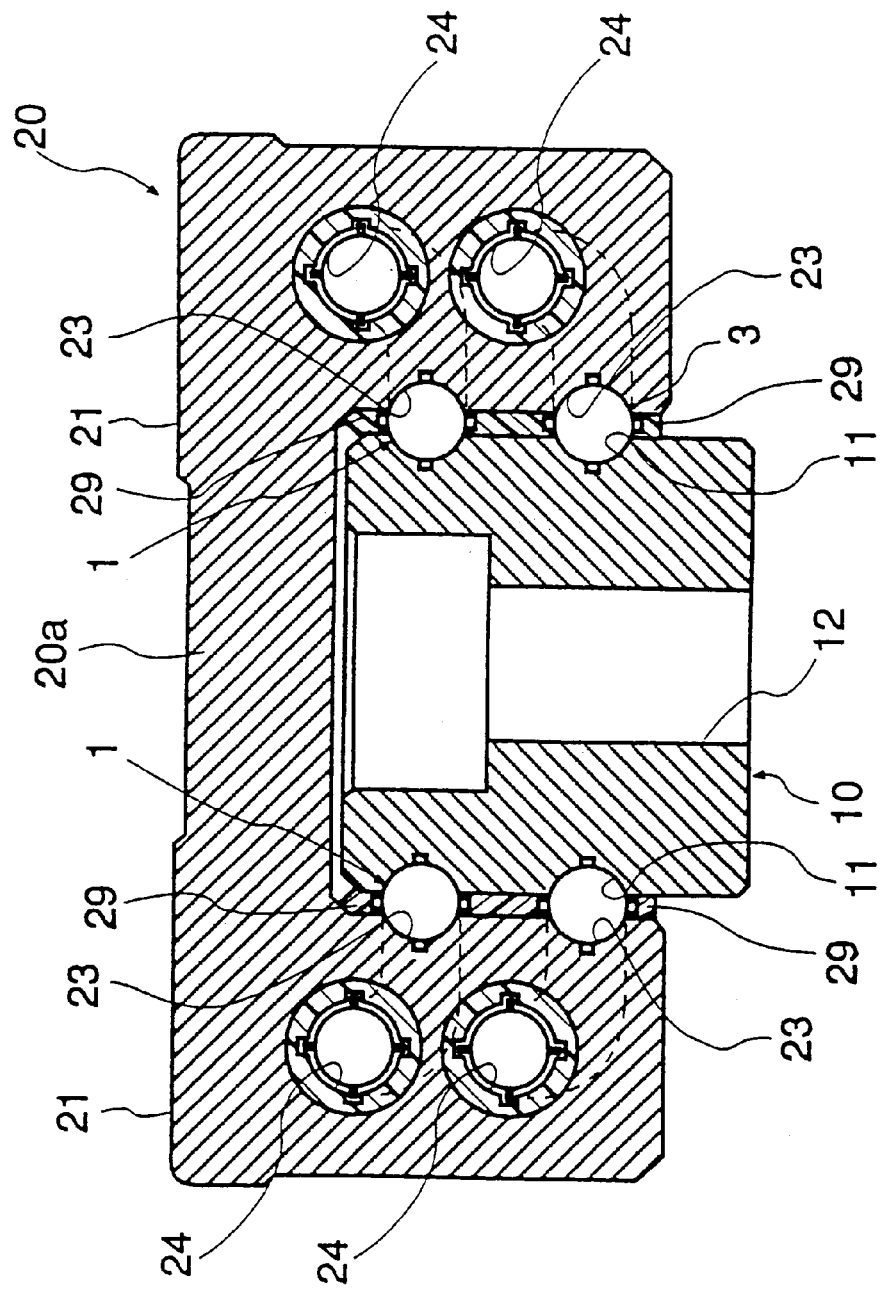
FIG. 6 is a sectional view showing a second embodiment of a bearing for linear sliding to which ball connectors according to the present invention are applied.

FIG. 6 shows a second embodiment to which a ball connector according to the present invention is applied to a bearing for linear sliding.

Although according to the first embodiment, mentioned above, one streak of the ball rolling groove 11 is formed at each of the both side faces of the track rail 10, according to the linear guide device of the embodiment, two streaks of the ball rolling grooves 11 are formed at each of the both side faces of the track rail 10 and the sliding base 20 can be moved on the track rail 10 against a load heavier than that in the first embodiment.

Further, two streaks of the load ball grooves 23 are formed on the side of each of the inner faces of the skirt portions 20b of the sliding base 20 and the balls 3 are rolled between the load rolling grooves 23 and the ball rolling grooves 11 of the track rail 10. All of the respective ball rolling grooves 11 and the respective load rolling grooves 23 are formed in a shape of a Gothic arch and the escape grooves 27 for incorporating the connecting portions 5 of the ball connector 1 mentioned above are similarly formed at the deepest portions of the respective grooves 11 and 23.

Further, guide portions 29 made of synthetic resin are padded on the sides of the inner faces of the skirt portions 20b of the sliding base 20 contiguous to the load rolling grooves 23 and the guide portions 29 guide the connecting portions 5 of the ball connectors 1 by which meandering and twisting of the ball connectors 1 under a loaded state are prevented. Further, with respect to other constitution, it is quite the same as that of the first embodiment mentioned above and accordingly, the same notations are attached thereto in FIG. 6 and a detailed explanation thereof will be omitted.

Also in this embodiment, the direction change paths 32 for communicating and connecting the load rolling grooves 23 with the ball return holes 24 are formed to bend to deviate from the ball contact directions and as a result of integrating the ball connectors 1 excellent in flexibility shown by FIG. 1 to the endless tracks, similar to the above-described first embodiment, the ball connectors 1 can pass through in the direction change paths 32 with no difficulty and smooth formation of circulation of the ball connectors 1 in the endless tracks can be achieved.

Third Embodiment

Figure 7:
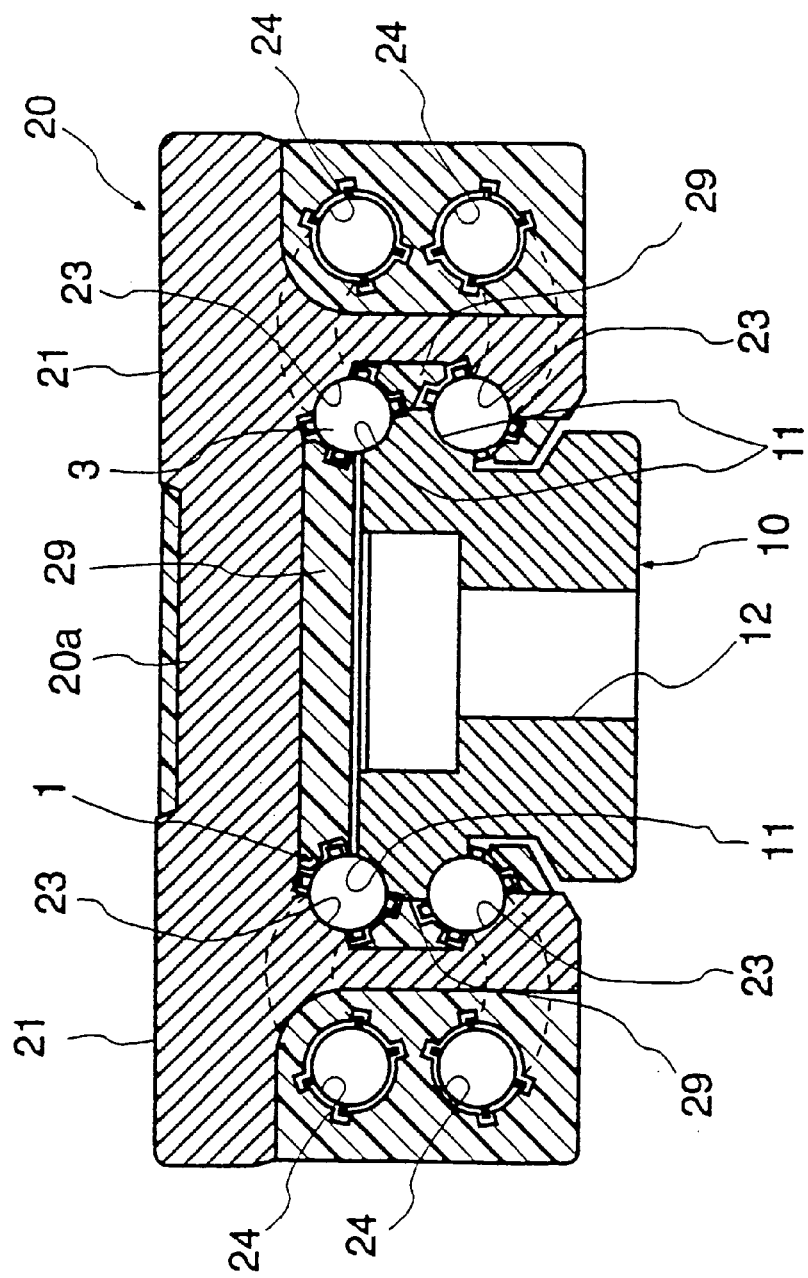
FIG. 7 is a sectional view showing a third embodiment of a bearing for linear sliding to which ball connectors according to the present invention are applied.

In the meantime, FIG. 7 shows a third embodiment to which a ball connector according to the present invention is applied to a bearing for linear sliding.

According to the embodiment, similar to the second embodiment mentioned above, two streaks of the ball rolling grooves 11 are formed at each of the both side faces of the track rail 10, however, each of the respective ball rolling grooves 11 is formed not in a shape of a Gothic arch where a pair of ball rolling faces are intersected but in a shape of a circular arc comprising a single ball rolling face. Further, each of the ball rolling grooves 11 is formed upwardly or downwardly by making an angle of 45° in respect of the horizontal direction, respectively.

Further, two streaks of the load ball grooves 23 in a shape of a circular arc opposed to the ball rolling grooves of the track rail are formed on the side of each of the inner faces of the skirt portions 20b of the sliding base 20 and the balls 3 are rolled between the load rolling grooves 23 and the ball rolling grooves 11 of the track rail 10. Further, also in the sliding base 20, the guide portions 29 made of synthetic resin are padded on the both sides of the respective load rolling grooves 23, the guide portions 29 guide the connecting portions 5 of the ball connectors 1 and meandering and twisting of the ball connectors 1 under a loaded state are prevented.

However, in this embodiment, there is a concern in which when the balls are rolling on the load rolling grooves 23 of the sliding base 20 and the ball rolling grooves 11 of the track rail 10, the belt portions 5 of the ball connectors 1 may be brought into contact with the load rolling grooves 23 and the ball rolling grooves 11 and accordingly, four of the belt members 5 for embracing the ball 3 are not arranged to equally divide the spherical face of the ball 3 into four, and four of the belt members 5 are arranged to deviate such that the interval between two of the belt members 5 disposed on the both sides of each of the load rolling grooves 23 and the ball rolling grooves 11 is widened. Incidentally, in respect of other constitution, it is quite the same as that of the first embodiment mentioned above and accordingly, the same notations are attached thereto in FIG. 7 and a detailed explanation thereof will be omitted.

The load rolling grooves 23 are formed downwardly or upwardly with an angle of 45° in respect of the horizontal direction and accordingly, in the case where smooth circulation of the ball 3 is considered, the ball return holes 24 are to be formed 45° upwardly or 45° downwardly to the respective load rolling grooves 23. However, when the ball return holes 24 are formed at such positions, there is a concern in which an interval between the ball return holes 24 contiguous to each other in the up and down direction is increased and the sliding base is magnified and accordingly, according to the embodiment, the respective ball return holes 24 are formed contiguously in the horizontal direction of the respective load rolling grooves 23 by forming to bend the direction change paths 32.

Further, even in the case where the ball return holes 24 are formed at such positions, according to the linear guide device of the embodiment, as a result of integrating the ball connectors shown by FIG. 1 in the endless tracks, the ball connectors 1 can pass through at insides of the direction change paths 32 with no difficulty and smooth formation of circulation of the ball connectors 1 in the endless tracks can be achieved.

Fourth Embodiment

Figure 8:
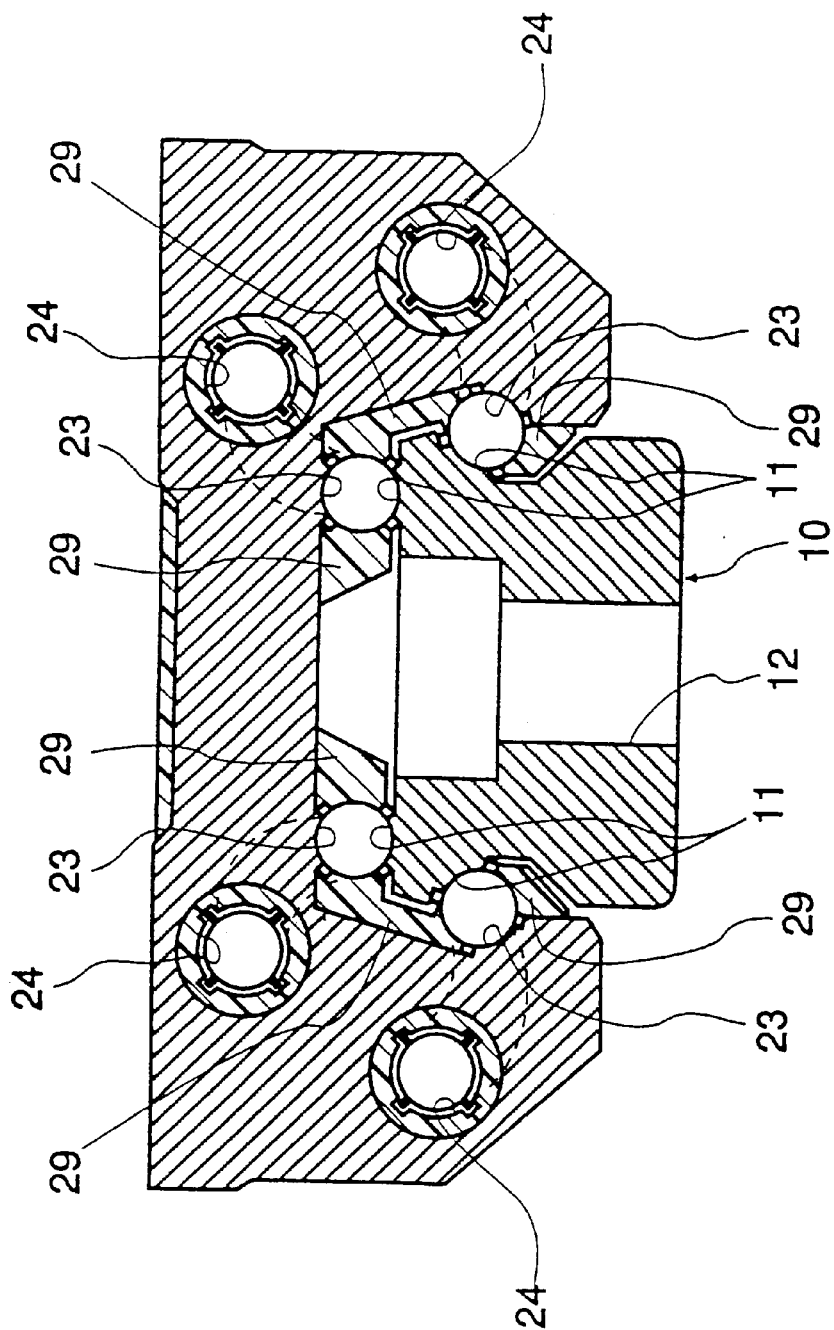
FIG. 8 is a sectional view showing a fourth embodiment of a bearing for linear sliding to which ball connectors according to the present invention are applied.

Further, FIG. 8 shows a fourth embodiment to which a ball connector according to the present invention is applied to a bearing for linear sliding.

The embodiment shows a linear guide device where positions of forming the ball rolling grooves 11 in respect of the guide rail 10 are changed from those in the third embodiment and two streaks of the ball rolling grooves 11 are formed on the upper face of the track rail 10, meanwhile, one streak of the ball rolling groove 11 is formed at each of the both side faces downwardly with an angle of 30°.

Further, the load rolling grooves 23 are formed in the sliding base 20 at positions opposed to the ball rolling grooves 11 of the track rail 10 and the balls 3 arranged at the ball connectors 1 are rolled between the ball rolling grooves 11 and the load rolling grooves 23 while carrying load. Incidentally, other constitution is quite the same as that in the third embodiment and accordingly, the same notations are attached thereto in FIG. 8 and a detailed explanation thereof will be omitted.

According to the linear guide device of the fourth embodiment, the load rolling grooves 23 directed downwardly are formed at the horizontal portion 20a of the sliding base 20 and accordingly, when it is assumed that the ball return holes 24 in correspondence with the load rolling grooves 23 are formed in the ball contact direction, the horizontal portion 23 of the sliding base 20 is obliged to be thickened to gain the length of the direction change paths, however, as shown by FIG. 8, according to the embodiment, the positions of forming the ball return holes 24 are displaced from the ball contact directions and the direction change paths 32 from the load rolling grooves 23 to the ball return holes 24 are formed to bend and therefore, even when the horizontal portion 20a of the sliding base 20 is formed thinly, the lengths of the direction change paths 32 can be gained and the radii of swirling of the balls 3 can be set large by those amounts.

Further, even when the direction change paths 32 are formed to bend, according to the linear guide device of the embodiment, as a result of integrating the ball connectors 1 shown by FIG. 1 to inside of the endless tracks, the ball connectors 1 can pass through the direction change paths 32 with no difficulty and smooth formation of circulation of the ball connectors 1 in the endless tracks can be achieved.

Fifth Embodiment

Figure 9:
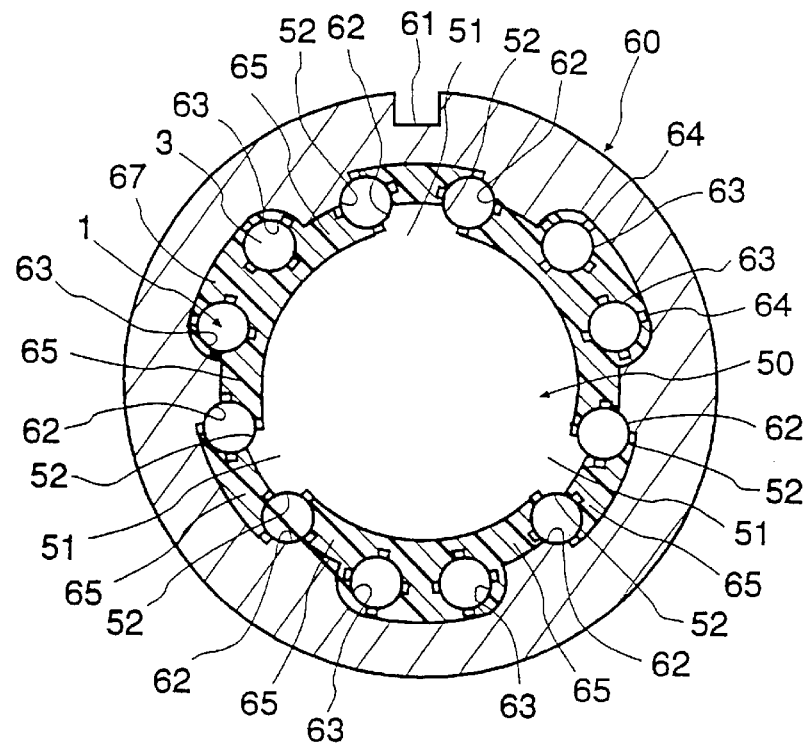
FIG. 9 is a sectional view showing a fifth embodiment of a ball spline device to which ball connectors according to the present invention are applied.
Figure 10:
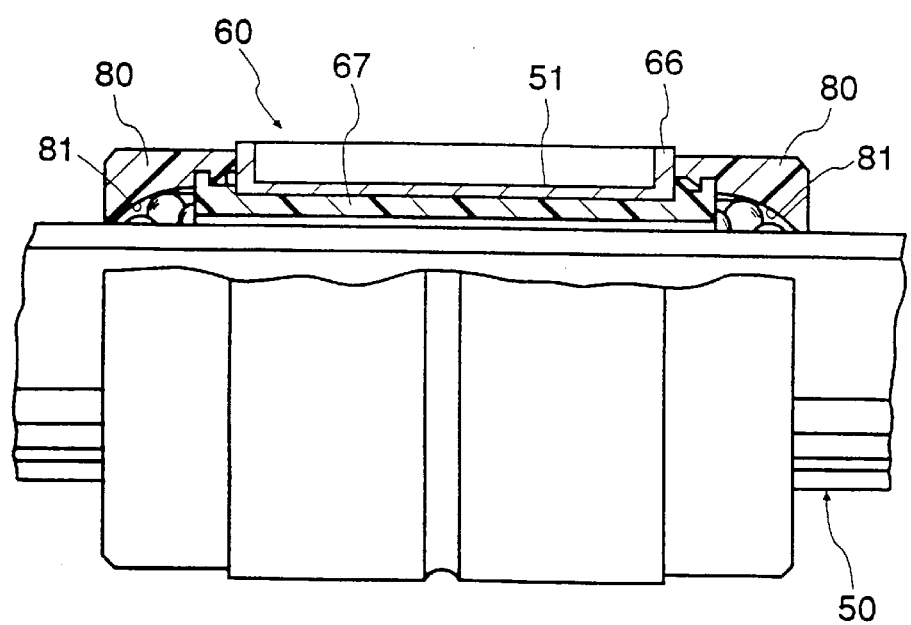
FIG. 10 is a side view showing the fifth embodiment of the ball spline device to which the ball connectors according to the present invention are applied.

Next, FIG. 9 and FIG. 10 show a fifth embodiment in which a ball connector according to the present invention is applied to a ball spline device.

In the drawings, notation 50 designates a spline shaft where ball rolling grooves are formed, notation 60 designates a nut member including ball endless tracks to which the ball connectors 1 are integrated and fitted to the outer periphery of the spline shaft 50 and notation 3 designates balls rolling between the spline shaft 50 and the nut member 60 while carrying load and endlessly circulated at inside of the nut member 60.

First, the spline shaft 50 is formed substantially in a cylindrical shape and projected streaks 51 along the axial direction (direction orthogonal to paper face of FIG. 9) are formed on an outer peripheral face thereof. The projected streaks 51 are arranged at three locations in the circumferential direction of the spline shaft 50 at equal intervals and ball rolling grooves 52 in a shape of a circular arc are formed respectively on both side faces of each of the projected streaks 51.

Further, the nut member 60 is formed in a cylindrical shape and is provided with a key groove 61 on an outer peripheral face thereof for fixing the nut member 60 to a movable body and in the meantime, load rolling grooves 62 in a shape of a circular arc opposed to the ball rolling grooves 52 of the spline shaft 50 are formed on an inner peripheral face thereof. A total of three sets of the load rolling grooves 62 are formed with a pair of the load rolling grooves 62 contiguous to each other as one set and the projected streak 51 of the spline shaft 50 is disposed between the pair of load rolling grooves 62 provided to each set.

Further, a ball return hole 63 in correspondence with each of the load rolling grooves 62 is formed at the vicinity of the inner peripheral face of the nut member 60 and the ball 3 which has finished rolling on the load rolling groove 62 and relieved of load is rolled in a direction reverse to a direction of rolling on the load rolling groove 62. Four streaks of guide grooves 64 are formed at inside of the ball return hole 63 in the longitudinal direction, the connecting portions 5 of the ball connector 1 under an unloaded state are guided by the guide grooves 64 and meandering of the ball connector 1 at inside of the ball return hole 63 is prevented.

Further, ball guide portions 65 are formed on the inner peripheral face of the nut member 60 contiguous to the load rolling grooves 62 and the connecting portions 5 of the ball connector 1 under a loaded state between the nut member 60 and the spline shaft 50 are guided to be brought into sliding contact with the ball guide portions 65.

The nut member 60 is fabricated by utilizing injection molding of synthetic resin. That is, the nut member 60 is formed by padding a resin portion 67 by injection molding to the inner peripheral face of a nut main body 66 made of metal formed by machining, while portions requiring mechanical strength such as the key groove 61, the load rolling grooves 62 and the like mentioned before are formed at the nut main body 66, portions where mechanical strength is not important such as the ball return holes 63, the ball guide portions 65 and so on are formed by synthetic resin and light weight formation of the nut member 60 is achieved as light as possible.

The ball connectors 1 are integrated to the ball endless tracks of the nut member 60 and the ball endless tracks are completed by fixing lids 80 made of synthetic resin to both of forward and rearward end faces of the nut member. That is, as shown by FIG. 10, when the lids 80 are fixed to the nut member 60, the load rolling grooves 62 and the ball return holes 63 are connected by direction change paths 81 in a U-like shape formed at the lids 80 by which the ball endless track circulating the load rolling groove 62 ▲ the ball direction change path 81 ▲ the ball return hole 63 ▲ the ball direction change path 81 ▲ the load rolling groove 62 is completed.

Further, according to the ball spline device of the embodiment constituted as described above, when the nut member 60 is moved on the spline shaft 50, the balls 3 are rolled on the load rolling grooves 62 of the nut member and the ball rolling grooves 52 of the spline shaft 50 and the ball connectors 1 are circulated at insides of the endless tracks formed in the nut member 60.

In this case, according to the ball spline device of the embodiment, to avoid magnification of the nut member, the position of forming the ball return hole 63 constituting the ball endless track is disposed at the vicinity of the inner peripheral face of the nut member and is not disposed in a direction where the ball rolling groove 52 of the spline shaft 50 and the load rolling groove 62 of the nut member 60 are opposed to each other, that is, the ball contact direction. That is, also in this embodiment, the direction change paths 81 of the lids 80 for communicating and connecting the load rolling grooves 62 with the ball return holes 63 are formed to deviate from the ball contact directions.

However, the ball connector 1 adopts the structure where it is easy to flex compliantly in any direction as described above and therefore, according to the ball spline device of the embodiment, even in the case where the direction change paths 81 are formed to bend, it can pass through the direction change paths 81 with no difficulty and smooth formation of circulation of the ball connector 1 at inside of the endless track can be achieved.

Sixth Embodiment

Figure 11:
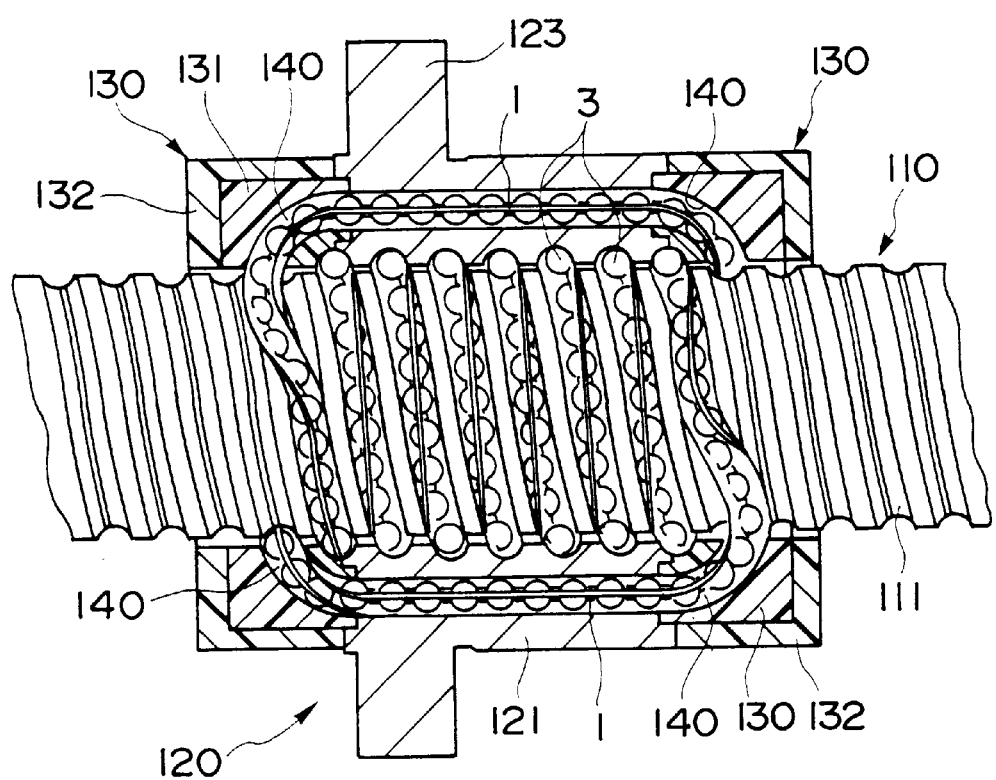
FIG. 11 is a sectional view showing a sixth embodiment of a ball screw device to which ball connectors according to the present invention are applied.

FIG. 11 shows a sixth embodiment of a ball screw device to which the ball connector is applied.

In the drawing, notation 110 designates a screw shaft where a ball rolling groove 111 in a spiral shape is formed with a predetermined lead, notation 120 designates a nut member having an endless track to which the ball connector 1 is integrated and in mesh with the screw shaft 110 and the nut member 120 is moved in the axial direction of the screw shaft 110 by relative rotation between the screw shaft 110 and the nut member 120. Further, according to the ball screw device, two streaks of the ball rolling grooves 111 are formed to the screw shaft 110 and the nut member 120 is also provided with two of the endless tracks to which the ball connectors 1 are integrated.

In this case, the nut member 120 is constituted by a nut main body 121 made of steel and a pair of lids 130 made of synthetic resin fixed to both of forward and rearward end faces of the nut main body 121 and the endless tracks of the balls 3 are completed by fixing the lids 130 to the nut main body 121.

Figure 12:
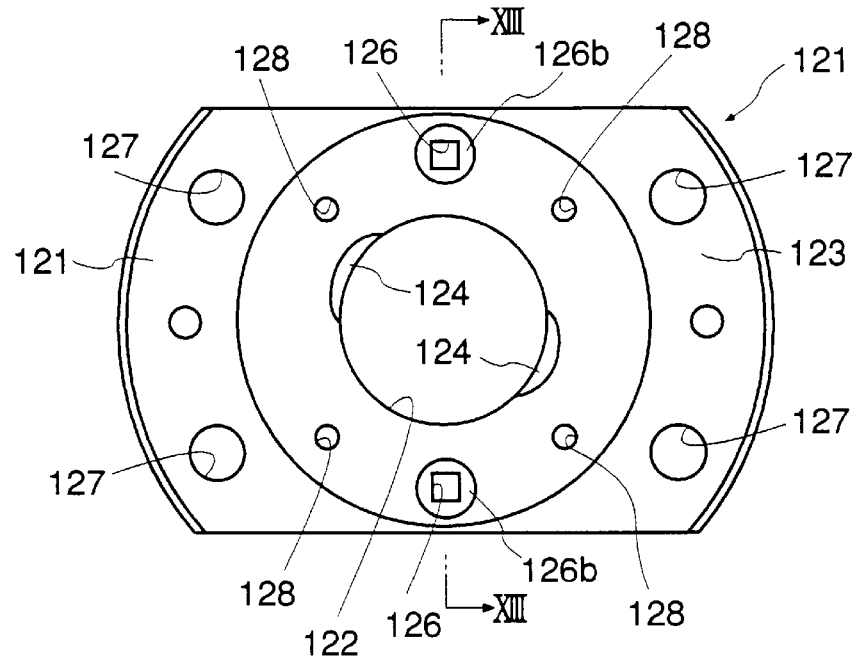
FIG. 12 is a front view showing a nut main body according to the sixth embodiment.
Figure 13:
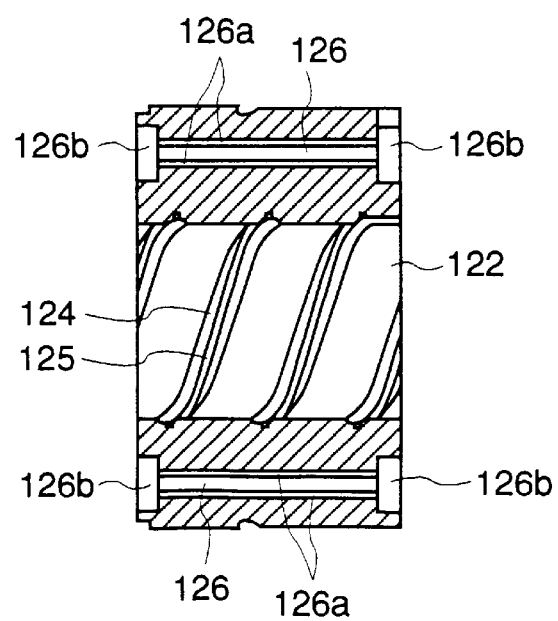
FIG. 13 is a sectional view taken from a line XII—XII of FIG. 12.

As shown by FIG. 12 and FIG. 13, the nut main body 121 is formed in a cylindrical shape having a through hole 122 of the screw shaft 110 at its center and a flange portion 123 is projected from an outer peripheral face thereof for fixing the nut main body 121 to a movable body such as a table or the like. Further, load rolling grooves 124 in a spiral shape opposed to the ball rolling grooves 111 of the screw shaft 110 are formed at the inner peripheral face of the through hole 122 and the balls 3 are rolled between the ball rolling groove 11 and the load rolling groove 124 while carrying load. The load rolling groove 124 is formed in a so-to-speak Gothic arch shape where two ball rolling faces are intersected and an escape groove 125 for incorporating the belt member 5 of the ball connecting body 1 is formed at the deepest portion of the groove.

Further, two of ball return holes 126 are perforated in the nut main body 121 along the axial direction. Four streaks of guide grooves 126*a* for guiding the belt members 5 of the ball connector 1 are formed at the inner diameter of the ball return hole 126 along the longitudinal direction and in the meantime, recess portions 126*b* are formed at both end opening portions thereof for fitting positioning bosses of return pieces 131, mentioned later. Incidentally, in FIG. 12, notation 127 designates bolt attaching holes opened at the flange portion 123 and notation 128 designates tap holes with which screws for attaching the lids 130 are brought in mesh.

Meanwhile, the respective lids 130 fixed to the both ends of the nut main body 121, are constituted by a pair of the return pieces 131 having direction change paths 140 for communicating and connecting the load rolling grooves 124 of the nut main body 121 with the ball return holes 126 and cover members 132 fixed to end portions of the nut main body 121 in a state where the return pieces 131 are held.

Figure 14:
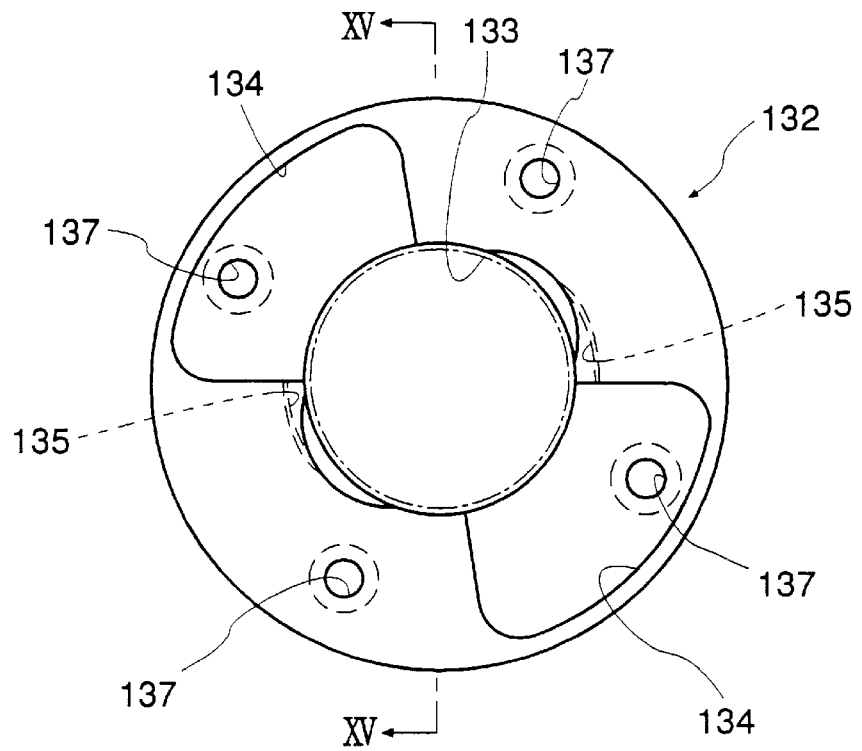
FIG. 14 is a back view showing a cover member according to the sixth embodiment.
Figure 15:
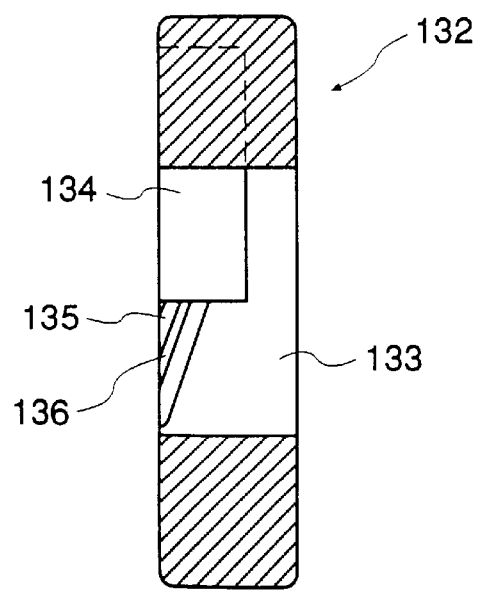
FIG. 15 is a sectional view taken along a line XIV—XIV of FIG. 14.

As shown by FIG. 14 and FIG. 15, in the cover member 132, a through hole 133 in correspondence with the through hole 122 of the nut main body is formed and recess portions 134 substantially in a shape of a fan for accommodating the return pieces are formed at two locations interposing the through hole 133. Further, on the inner peripheral face of the through hole 133, introductory paths 135 for guiding the balls 3 which roll out from the load rolling faces 124 of nut main body 121 into the direction change paths 140 of the return piece 131 are formed and guide grooves 136 for guiding the belt members 5 of the ball connectors 1 are formed also in the introductory paths 135. Incidentally, notation 137 in FIG. 14 designates attaching holes of attaching screws screwed to the nut main body 121.

Figure 16:
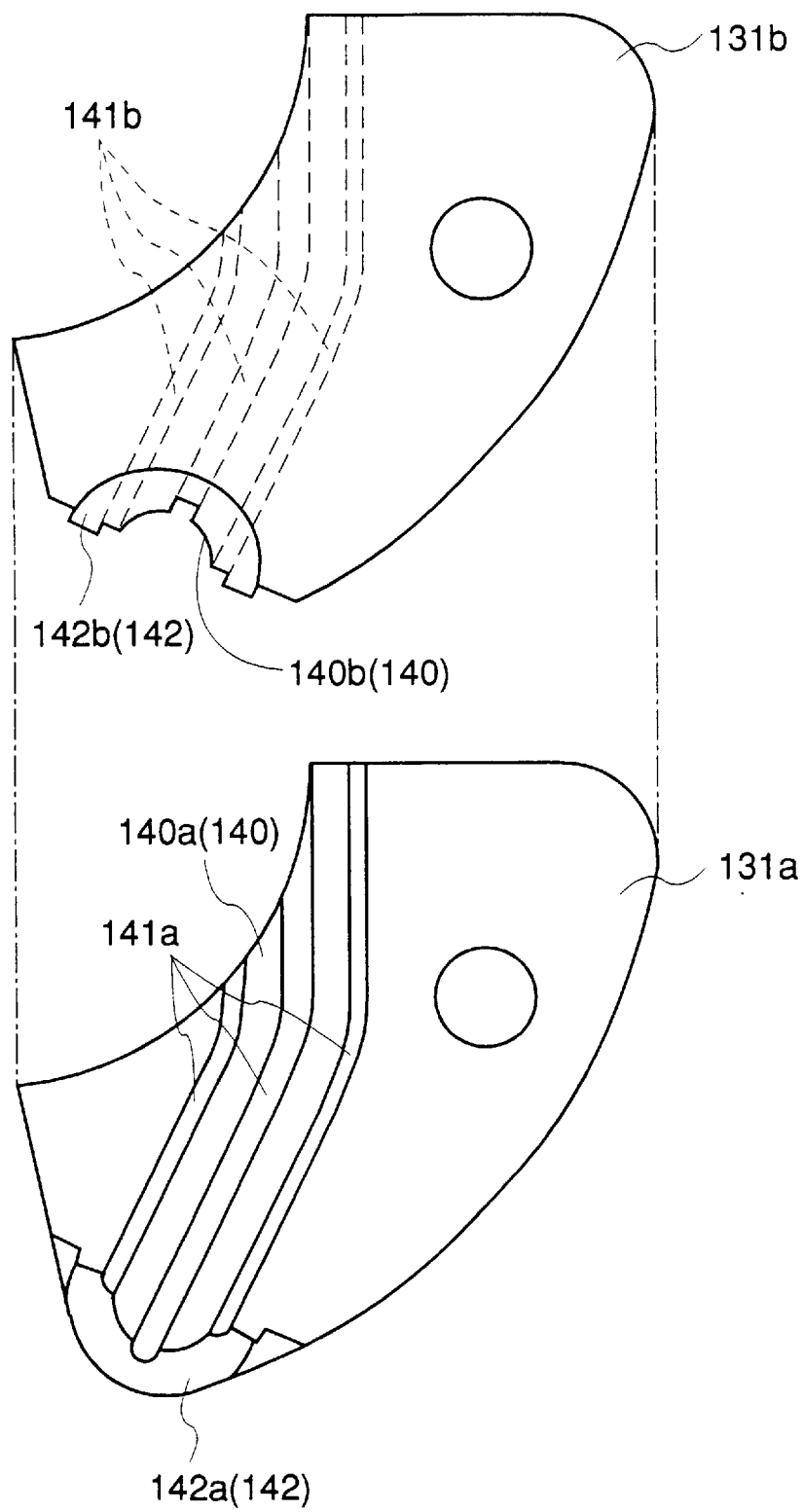
FIG. 16 is a disassembled front view showing a return piece according to the sixth embodiment.
Figure 17:
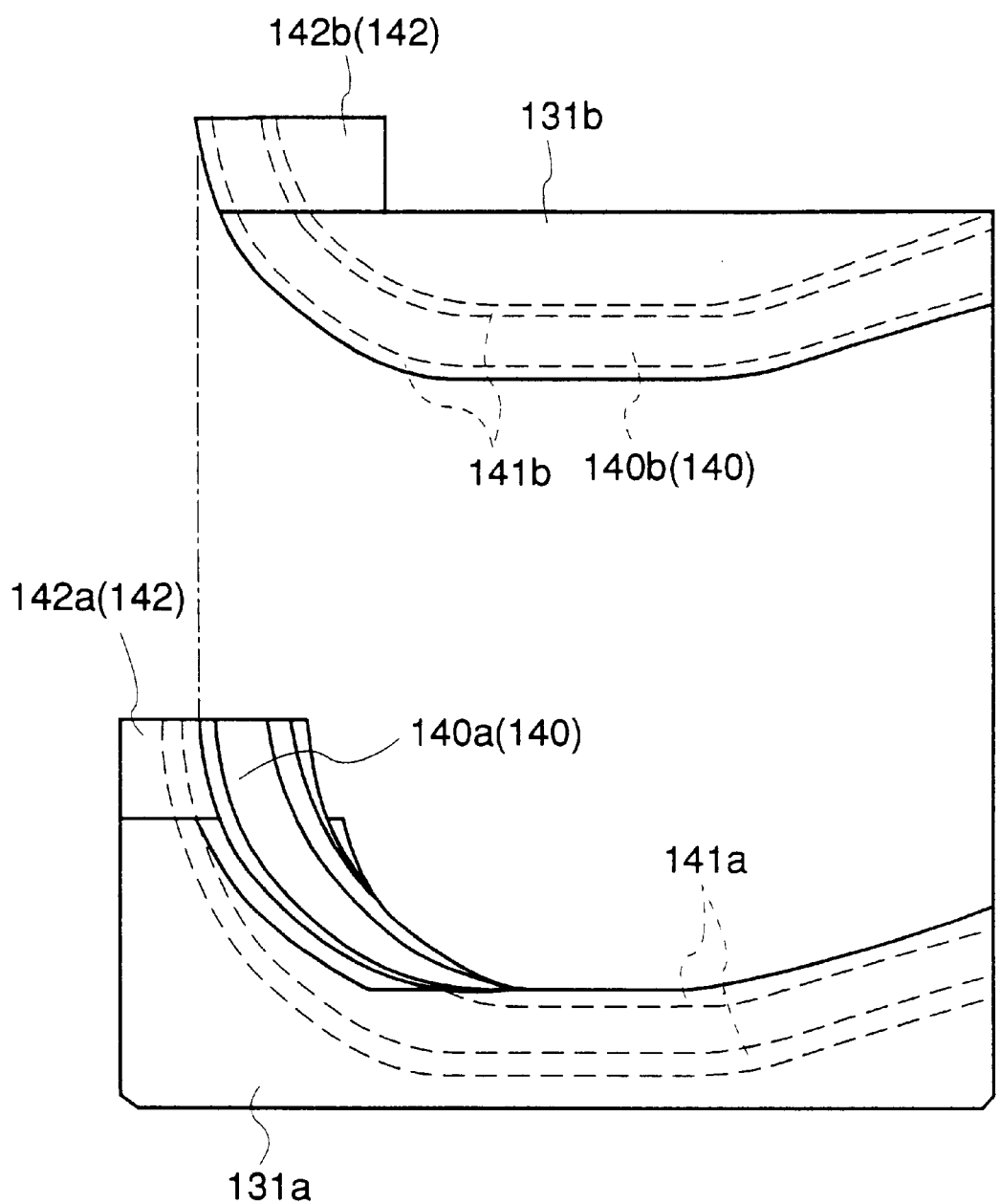
FIG. 17 is a disassembled side view showing the return piece according to the sixth embodiment.

Further, as shown by FIG. 16 and FIG. 17, the return piece 131 fitted to the recess portion 134 of the cover member 132, is constituted by a pair of a first piece 131a and a second piece 131b fitted to the recess portion 134 in mutually overlapped state and the direction change path 140 is completed by overlapping the pieces 131a and 131b. The respective pieces 131a and 131b are fabricated by injection molding of synthetic resin, recessed streak grooves 140a and 140b having the section in a substantially semicircular shape produced by dividing in two the direction change path 140 along the longitudinal direction, are respectively formed at the surface of the first piece 131a and the rear face of the second piece 131b and further, guide grooves 141a and 141b for guiding the belt members 5 of the ball connector 1 are similarly formed respectively at the recessed streak grooves 140a and 140b.

As shown by FIG. 16, on the inner diameter side of the return piece 131, the direction change path 140 is extended in the tangential direction of the through hole 133 of the cover member 132 and in the meantime, as shown by FIG. 17, on the outer diameter side, the direction change path 140 rises to the surface side of the second piece 138b. Thereby, the ball 3 which has finished rolling on the load rolling groove 124 of the nut main body 121, is smoothly introduced into the direction change path 140 via the introductory path 135 of the cover member 132 and in the meantime, the direction of rolling is changed from the radius direction to the axial direction of the nut member 120 and the ball 3 is sent smoothly to the ball return hole 126 of the nut main body 121.

Further, projected pieces 142a and 142b in a semicircular shape are projected on surfaces of the respective pieces 131a and 131b in correspondence with the direction change path 140 and when the first piece 131a and the second piece 131b overlap, the projected pieces 142a and 142b are combined by which the positioning boss 142 of the return piece 131 is completed at an end portion of the direction return path 140.

Figure 18:
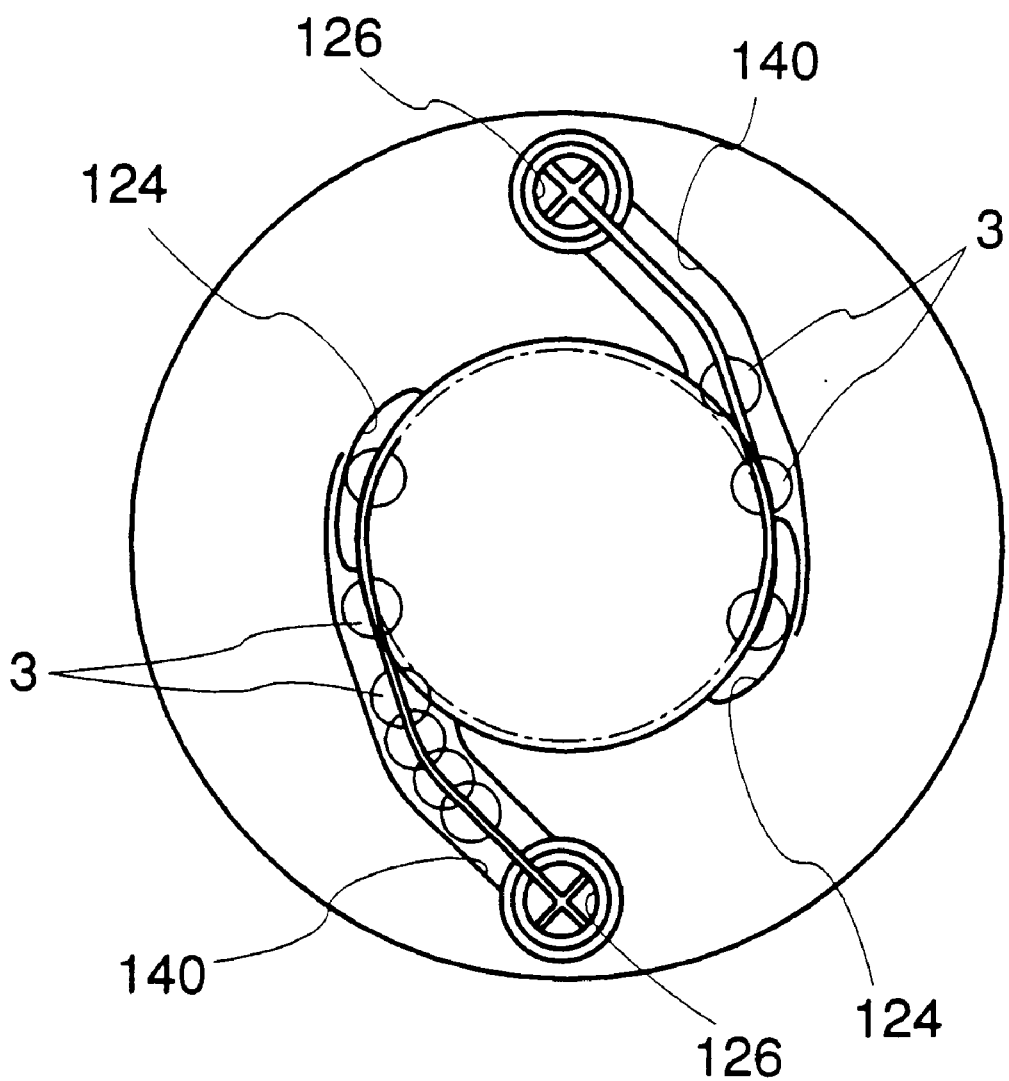
FIG. 18 is a perspective view of a lid showing direction change paths of balls formed at inside of the lid according to the sixth embodiment.

Further, the pieces 131a and 131b are fitted to the recess portion 134 of the cover member 132 in an order from the first piece 130a and the cover member 132 is fixed to the nut main body 121 such that the second piece 131b is brought into contact with the nut main body 121 by which attachment of the lid 130 to the nut main body 121 is completed. Thereby, as shown by FIG. 18, the load rolling groove 124 of the nut main body 121 and the ball return hole 126 is communicated and connected by the direction return path 140 and the endless track of the balls 3 is completed in the nut member 120. In this case, by fitting the positioning boss 142 formed at the return piece 131 to the recess portion 126b formed at the end portion of the ball return hole 126 of the nut main body 121, the positional relationship between the nut main body 121 and the lid 130 is made proper and smooth formation of rolling the balls 3 between the ball return hole 126 and the direction change path 140 is ensured. Incidentally, FIG. 18 perspectively views the lid 130 mounted to the nut main body 121 from the axial direction of the screw shaft 110.

According to the ball screw device of the embodiment constituted as described above, when the screw shaft 110 is rotated relative to the nut member 120, the balls 3 integrated to the ball connector 1 roll on the load rolling groove 124 of the nut member 120 and the ball rolling groove 111 of the screw shaft 110 and the ball connector 1 is circulated at inside of the endless track formed in the nut member 120.

In this case, according to the ball screw device of the embodiment, the ball connector 1 is wound spirally on the outer periphery of the screw shaft 110 and accordingly, the ball connector 1 is circulated in the endless track while being accompanied with twist. However, the ball connector 1 of the embodiment adopts the structure where it is easy to flex and easy to twist compliantly in any direction as mentioned above and accordingly, the ball connector 1 can be circulated on the endless track of the nut member 120 with no difficulty and smooth formation of circulation of the ball connector 1 in the endless track can be achieved.

Further, even when the ball connector 1 is frequently flexed or twisted, according to the ball connector 1 of the embodiment, the balls 3 are completely embraced by the connector belt 2 and accordingly, the balls 3 do not come off the ball connector 1 and accident of detaching the balls 3 from the endless track can be prevented beforehand.

Seventh Embodiment

Figure 19:
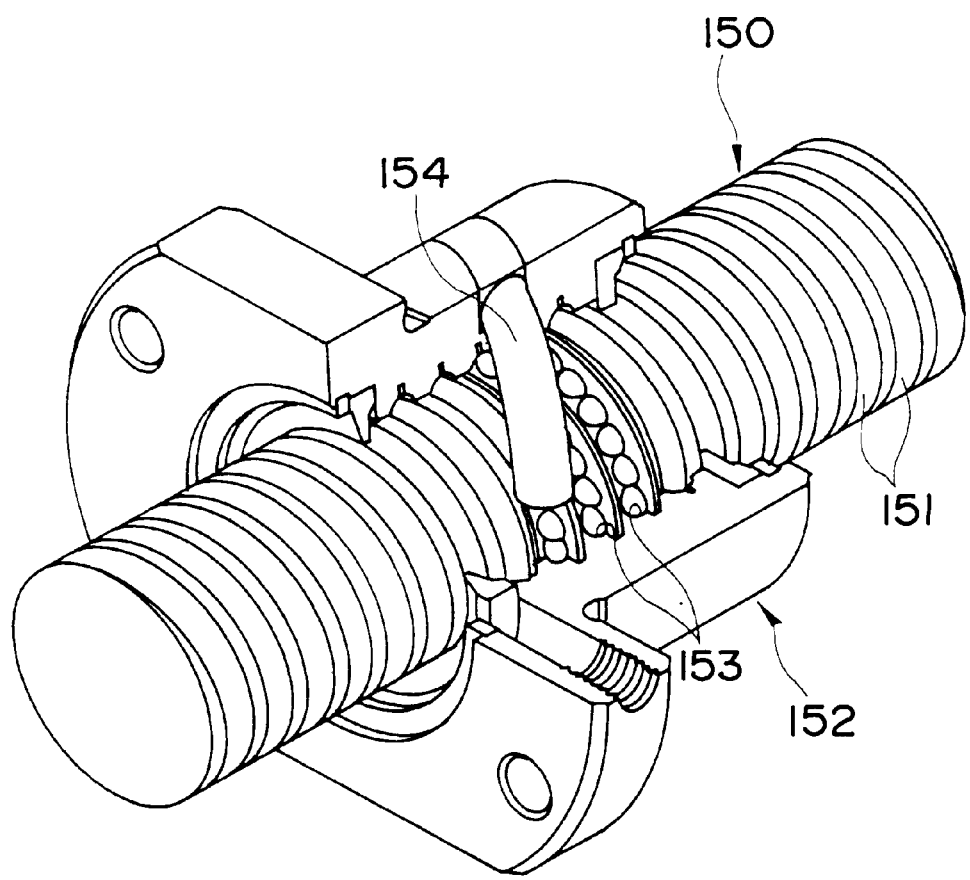
FIG. 19 is a perspective view showing a seventh embodiment of a ball screw device to which a ball connector according to the present invention is applied.

FIG. 19 shows a seventh embodiment in which a ball connector according to the present invention is applied to a ball screw device.

Although according to the sixth embodiment described above, the endless tracks of the balls are constituted by using the lids fixed to both of the forward and rearward end faces of the nut main body and the ball connectors shown by FIG. 1 are integrated into the endless tracks, according to the embodiment, an endless track of balls is constituted by a return pipe fixed to a nut member and the ball connector 1 the same as that in the sixth embodiment is integrated to the endless track.

In the drawing, notation 150 designates a screw shaft where a ball rolling groove 151 in a spiral shape is formed, notation 152 designates a nut member where a load rolling groove 153 opposed to the above-described ball rolling groove 151 is formed and notation 154 designates a return pipe fixed to the nut member 152. The return pipe is fixed to the nut member 152 to skip several turns of the ball rolling groove 151 of the screw shaft and the balls 3 scooped up by an end portion of the return pipe 154 from the ball rolling groove 151 of the screw shaft 150, roll at inside of the return pipe 154 and sent into the ball rolling groove 151 ahead of several turns by which the balls 3 are endlessly circulated at inside of the nut member 152.

Figure 20A:
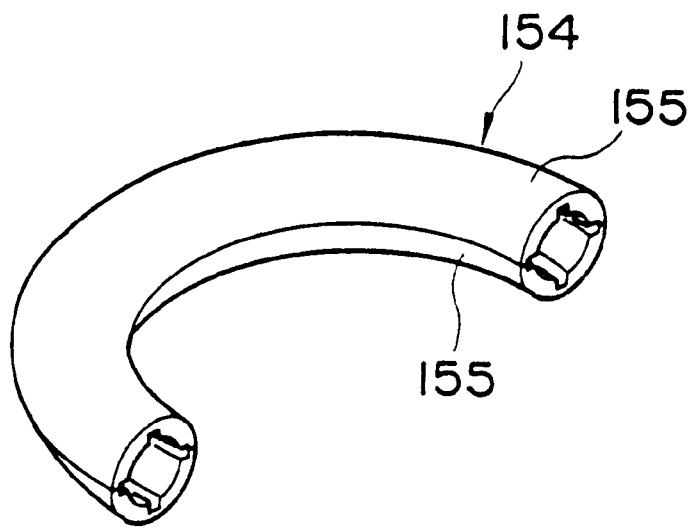
FIGS. 20(a) and 20(b) illustrate a perspective view showing a return pipe according to the seventh embodiment and a perspective view showing a pipe half of the pipe constituting the return pipe.
Figure 20B:
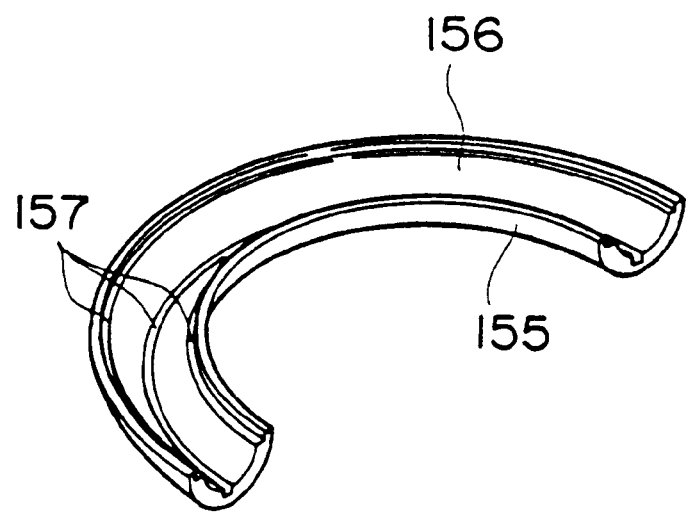

As shown by FIGS. 20(a) and 20(b), the return pipe 154 is constituted by combining a pair of pipe halves 155 the section of each of which is formed substantially in a semicircular shape and the respective pipe halves 155 are fabricated by injection molding of synthetic resin. Further, a recessed streak groove 156 constituting a ball return path is formed at each of the pipe halves 155 and in the meantime, guide grooves 157 for guiding the belt members 5 of the ball connector 1 are formed at the recessed streak groove 156.

Further, also in the case of the ball screw device according to the embodiment constituted as described above, the ball connector 1 integrated to the endless track of the nut member 152 is provided with a structure where it is easy to flex and easy to twist compliantly in any direction and accordingly, it can be circulated on the endless track of the nut member 152 with no difficulty and smooth formation of circulation of the ball connector 1 in the endless track can be achieved.

Further, the ball connector 1 is circulated at inside of the endless track under a state where the belt members 5 are fitted to the guide grooves 157 of the return pipe 154 and accordingly, when the balls 3 approach the return pipe 154, they are drawn into the return pipe 154 by being pulled by the connector belt 2 constituting the ball connector 1 and accordingly, the balls 3 go into and come out from the return pipe 154 smoothly and circulation of the balls 3 in the endless track can be carried out smoothly also thereby.

Eighth Embodiment

Figure 21:
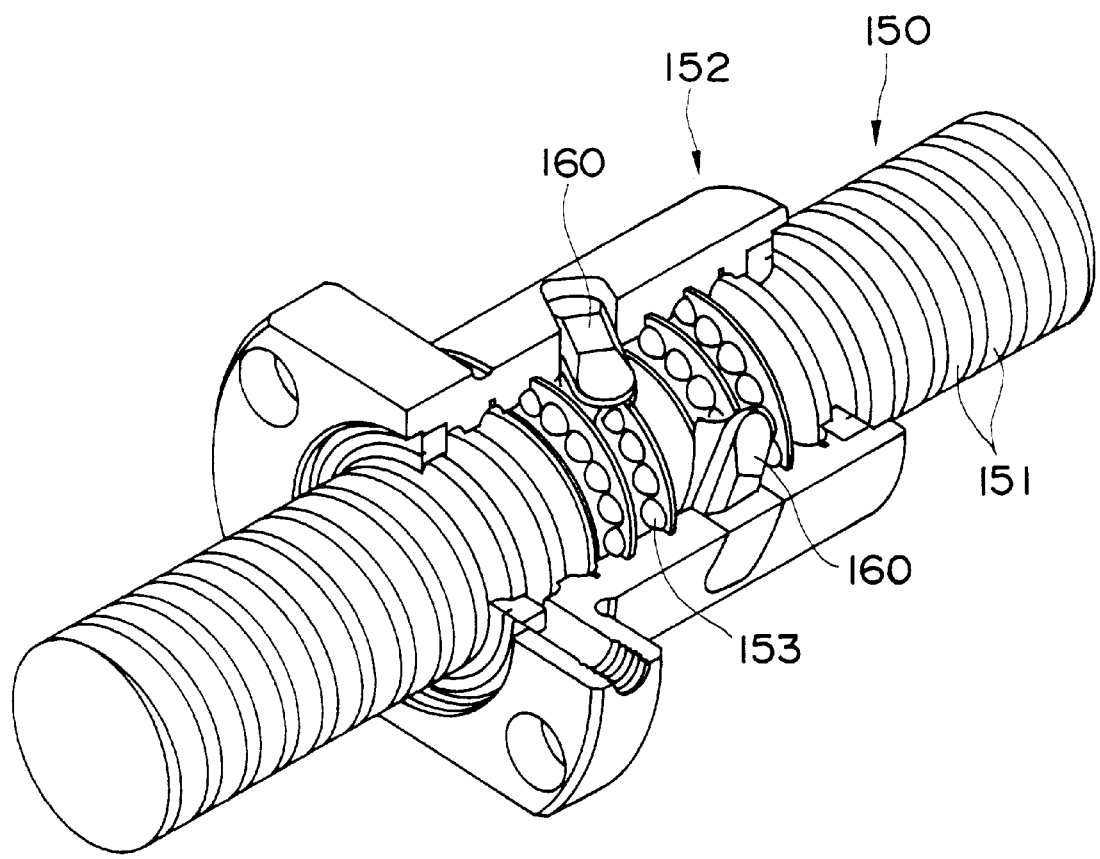
FIG. 21 is a perspective view showing an eighth embodiment of a ball screw device to which a ball connector according to the present invention is applied.

Next, FIG. 21 shows an eighth embodiment to which the ball connector according to the present invention is applied to a ball screw device.

According to the eighth embodiment, in place of the return pipe 154 used in the seventh embodiment described above, a deflector 160 is fixed to the nut member 152, the endless track of the balls 3 is constituted by using the deflector 160 and the above-described ball connector 1 is integrated to the endless track. Other constitution is quite the same as that in the seventh embodiment described above and accordingly, the same notations are attached thereto in FIG. 21 and a detailed explanation thereof will be omitted.

As shown by FIG. 21, the deflector 160 is fixed to the nut member 152 to skip one turn of the ball rolling groove 151 of the screw shaft 150, the progress path of the balls 3 rolled out of the ball rolling groove 151 is changed by the deflector 160 and the balls 3 are returned to the ball rolling grooves 151 ahead of one turn by riding over the outer diameter of the screw shaft 150 by which the balls 3 are endlessly circulated at inside of the nut member 152. Further, three of the deflectors 160 are fixed to the nut member 152 in this embodiment to divide the circumference of the nut member 152 into three and a total of three tracks of endless tracks of the balls 3 are formed. Accordingly, three of the ball connectors 1 are integrated to the nut member 152.

Figure 22:
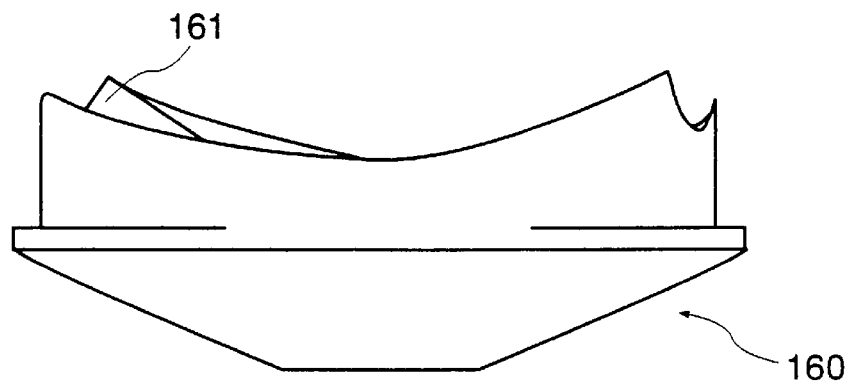
FIG. 22 is a front view showing a deflector according to the eighth embodiment.
Figure 23:
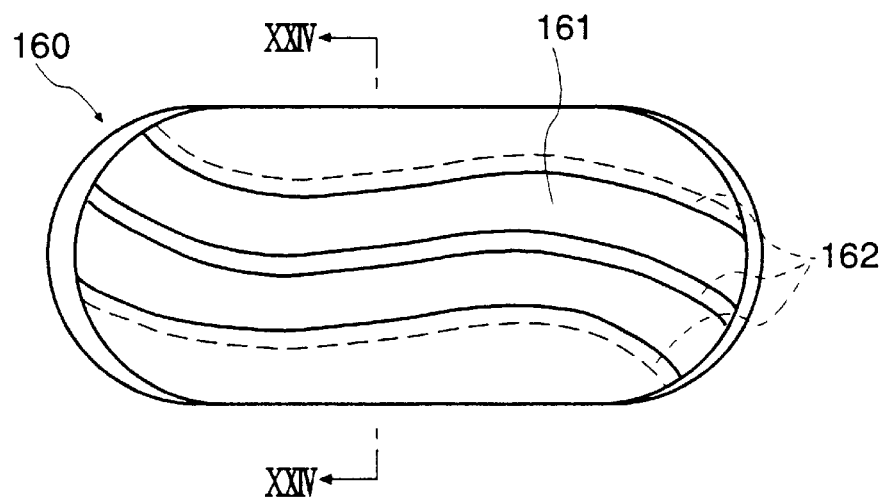
FIG. 23 is a plane view showing the deflector according to the eighth embodiment.
Figure 24:
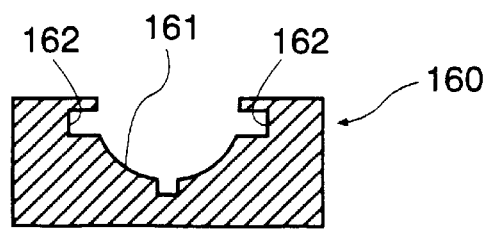
FIG. 24 is a sectional view taken along a line XXIV—XXIV of FIG. 23.
Figure 25:
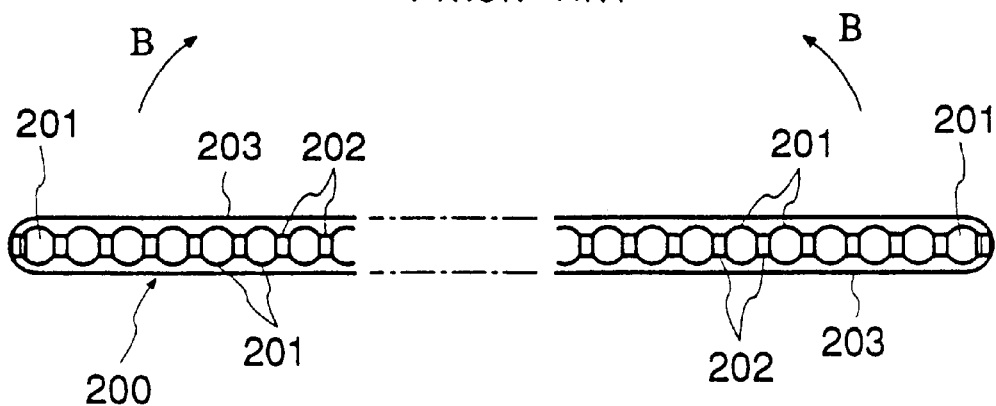
FIG. 25 is a plane view showing a conventional ball chain.
Figure 26:
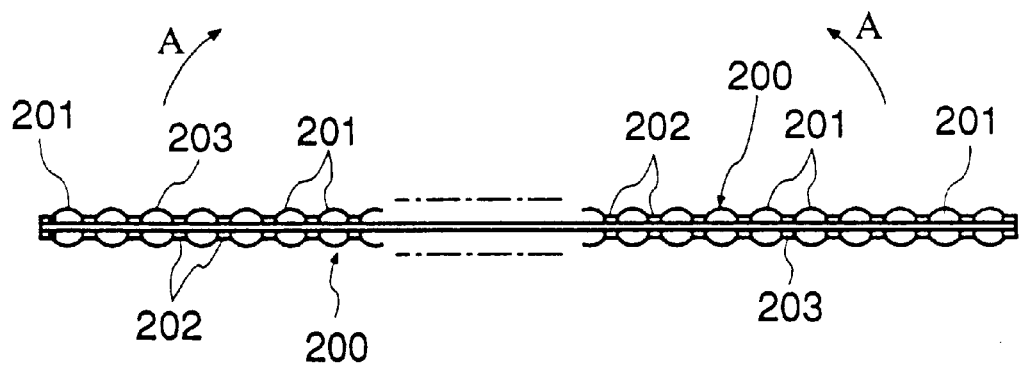
FIG. 26 is a side view showing the conventional ball chain.
Figure 27:
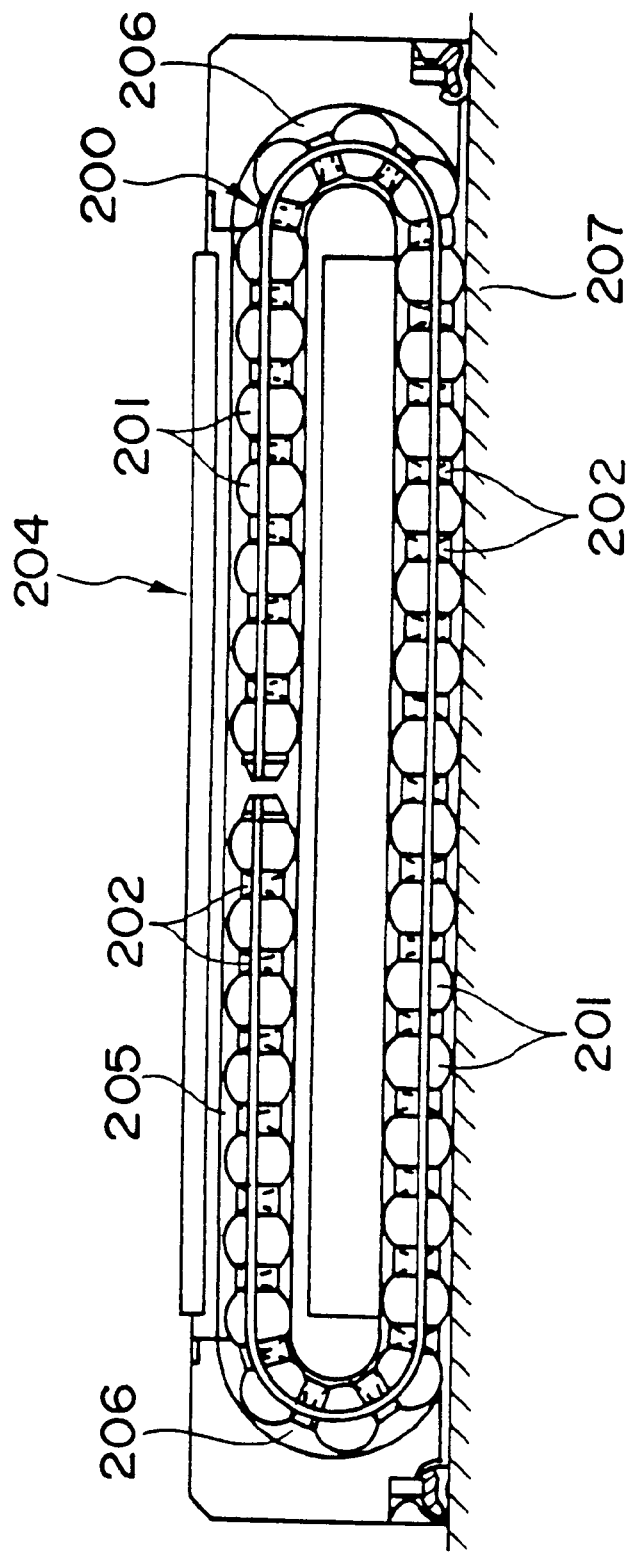
FIG. 27 is a sectional view showing a state where the conventional ball chain is integrated to an endless track of a linear guide device.
Figure 28:
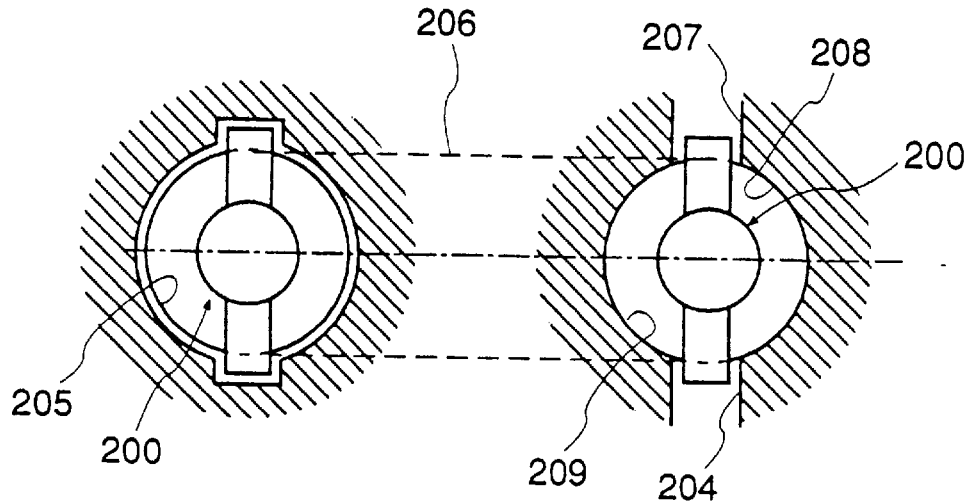
FIG. 28 is an outline view showing a behavior of ball circulation in the case where a ball return hole is present in a ball contact direction in respect of a load ball groove.
Figure 29:
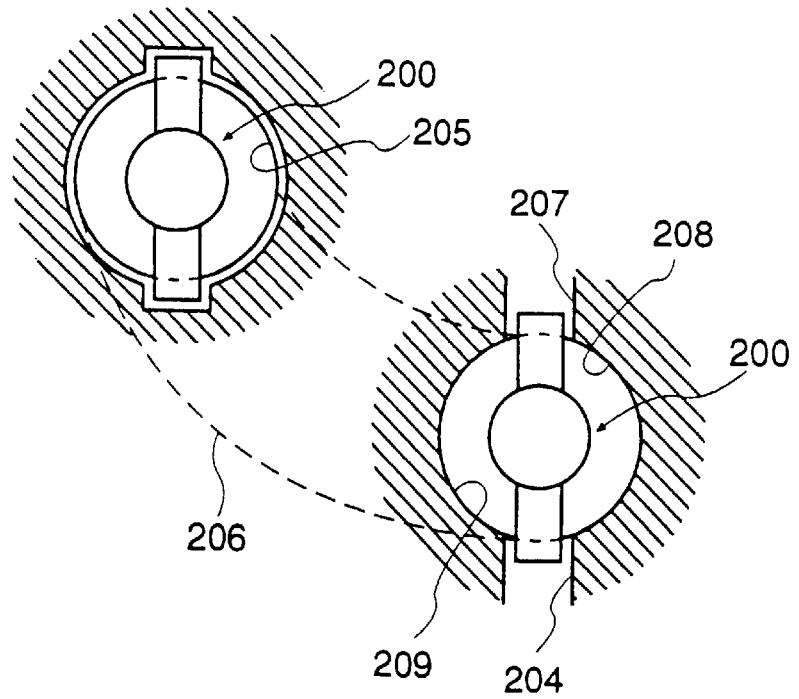
FIG. 29 is an outline view showing a behavior of ball circulation in the case where the ball return hole is present at a position deviated from the ball contact direction in respect of the load ball groove.

FIG. 22 through FIG. 24 show a detailed structure of the deflector 160.

The ball return groove 161 substantially in a shape of an S-like streak is formed in the deflector 160 and guide grooves 162 for guiding the belt members 5 of the ball connector 1 are formed at the center and the both sides of the ball return groove 161. Further, the ball return groove 161 is provided with a shape where it is recessed mostly at the central position of the deflector 160 such that the balls 3 progressing into the ball return groove 161 can ride over the outer diameter of the screw shaft 150.

Further, also in the ball screw device of the embodiment constituted as described above, the ball connector 1 is provided with the structure where the ball connector 1 integrated to the endless track of the nut member 152 is easy to flex and easy to twist compliantly in any direction and accordingly, the ball connector 1 can be circulated on the endless track of the nut member 152 with no difficulty and smooth formation of circulation of the ball connector 1 at inside of the endless track can be achieved.

Further, also in this embodiment, the ball connector 1 is circulated at inside of the endless track under a state where the belt members 5 are fitted to the guide grooves 161 of the deflector 160 and accordingly, when the balls 3 approach the deflector 160, they are drawn into the deflector 160 from the ball rolling groove 151 of the screw shaft 150 by being pulled by the connector belt 2 and accordingly, the motion of the balls 3 in riding over the outer diameter of the screw shaft 150 is made smooth and the circulation of the balls 3 in the endless track can be carried out smoothly also thereby.

Industrial Applicability

As has been explained above, the ball connector according to the present invention is provided with the structure in which the connector belt is formed in the shape where it is constricted among the balls contiguous to each other which is easy to flex compliantly in any direction and which is easy to absorb twist operated on the ball connector and accordingly, when the ball connector is integrated to a ball endless track of a linear guide device, a ball screw device or the like, it can be used by being flexed or twisted freely and the ball connector can be circulated smoothly in the endless track even under such a state of use.

Further, according to the ball connector of the present invention, the balls integrated thereto are under a state where they are completely embraced by the connector belt and even in the case where the ball connector is flexed or twisted considerably, the balls do not come off the connector belt and therefore, by integrating the ball connector into the ball endless track of a linear guide device, a ball screw device or the like, the balls can be prevented from coming off the endless track without using a ball retainer.

We claim:

1. A ball connector comprising:

a number of balls arranged in one row at predetermined intervals; and a flexible connector belt formed by injection molding of a synthetic resin material rotatably holding the balls and connecting together the balls contiguous to each other, said connector belt including four belt members formed in a strip-like shape along peripheral faces of the balls and brought into contact with the plurality of balls;

wherein the ball members are connected mutually with other ones of the belt members at intermediaries of the balls contiguous to each other and the connector belt is formed in a shape constricted in comparison with an outer diameter of the ball at positions of the intermediaries connecting the balls.

2. The ball connector according to claim 1, wherein the connector belt is arranged with the belt members to divide the spherical face of each of the balls in four.

3. A linear guide device utilizing the ball connector according to claim 1, said linear guide device comprising:

a guide shaft having ball rolling grooves for rolling balls in a longitudinal direction;

a slide member having load rolling grooves for rolling the balls while carrying a load between the guide shaft and the load rolling grooves, having endless tracks for circulating the balls and moved along the guide shaft in accordance with circulation of the balls; and wherein the ball connector according to claim 1 is integrated to one of the endless tracks and the ball connector is circulated in the endless track in accordance with a relative movement between the guide shaft and the slide member.

4. The linear guide device according to claim 3, wherein each of the ball rolling grooves of the guide shaft and the load rolling grooves of the slide member is provided with a section in a shape of a Gothic arch where a pair of ball rolling faces are intersected and escape grooves for incorporating and guiding connecting portions of the ball chain are formed at a deepest portion of each of the ball rolling grooves and the load rolling grooves in the shape of the Gothic arch.

5. The linear guide device according to claim 3, wherein each of the ball rolling grooves of the guide shaft and the load rolling grooves of the slider is provided with a section in a shape of a circular arc comprising a single ball rolling face.

6. A ball screw device utilizing the ball connector according to claim 1, said ball screw device comprising:

a screw shaft having ball rolling grooves in a spiral shape for rolling balls at an outer peripheral face thereof;

a nut member having load rolling grooves in a spiral shape for rolling the balls while carrying a load between the screw shaft and the load rolling grooves, having endless tracks for circulating the balls and screwed to the screw shaft via the balls; and wherein the ball connector according to claim 1 is integrated to one of the endless track and the ball connector is circulated in the endless track in accordance with a relative movement between the screw shaft and the nut member.

7. The ball connector of claim 1, further comprising:

a plurality of connecting portions interposed between adjacent balls and connected to each of the belt members.

8. The ball connector of claim 7, wherein the plurality of connecting portions and the four belt members are integrally connected and are formed by injection molding.

* * * * *